(12) United States Patent
Webber

(10) Patent No.: US 6,954,721 B2
(45) Date of Patent: Oct. 11, 2005

(54) SIGNAL PROCESSING TECHNIQUE

(75) Inventor: Christopher J St C Webber, Malvern (GB)

(73) Assignee: QinetiQ Limited, Farnborough (GB)

( * ) Notice: Subject to any disclaimer, the term of this patent is extended or adjusted under 35 U.S.C. 154(b) by 110 days.

(21) Appl. No.: 10/182,912

(22) PCT Filed: Jan. 31, 2001

(86) PCT No.: PCT/GB01/00369

§ 371 (c)(1),
(2), (4) Date: Aug. 2, 2002

(87) PCT Pub. No.: WO01/61526

PCT Pub. Date: Aug. 23, 2001

(65) Prior Publication Data

US 2003/0055610 A1 Mar. 20, 2003

(30) Foreign Application Priority Data

Feb. 17, 2000 (GB) .............................................. 0003571

(51) Int. Cl.$^7$ .............................................. G06F 15/00
(52) U.S. Cl. ..................................... 702/189; 375/343
(58) Field of Search ............................... 375/142–143, 375/150, 152, 259–261, 365–367, 343; 370/514–515, 320, 335, 342, 441, 479; 702/57–59, 189–197

(56) References Cited

U.S. PATENT DOCUMENTS

| 5,285,480 | A | * | 2/1994 | Chennakeshu et al. | ..... 375/348 |
| 5,453,940 | A | * | 9/1995 | Broomhead et al. | ........ 702/109 |
| 5,694,474 | A | * | 12/1997 | Ngo et al. | ..................... 381/66 |
| 5,943,132 | A | * | 8/1999 | Erskine | ....................... 356/484 |
| 6,570,576 | B1 | * | 5/2003 | McIntyre et al. | ........... 345/600 |
| 6,700,923 | B1 | * | 3/2004 | Dowling et al. | ............ 375/148 |

OTHER PUBLICATIONS

Dinc et al; "Convergence and Performance Comparison of Three Different Structures of Bootstrap Blind Adaptive Algorithm for Multisignal Co–Channel Separation"; Military Communications Confernece, 1992, Milcom 92, Conference Reocrd. Communications–Fusing Command, Control and Intelligence., IEEE San Diego, CA, Oct. 11–14, 1992, NY, NY, Oct. 11, 1992, pp. 913–918, XP010060837.

Te–Won Lee et al; "A Contextual Blind Separation of Delayed and Convolved Sources" Acoustics, Speech, and Signal Processing, 1997, ICASSP–97, IEEE International Confernece on Munich, Germany Apr. 21–24, 1997, Los Alamitos, CA, IEEE Comput. Soc., US, Apr. 21, 1997, pp. 1199–1202, XP010226015.

* cited by examiner

Primary Examiner—Marc S. Hoff
Assistant Examiner—Mary Catherine Baran
(74) Attorney, Agent, or Firm—Nixon & Vanderhye P.C.

(57) ABSTRACT

A signal processing technique for generating separated signal components incorporates the steps of correlating basis vectors with input data to produce output vectors, applying a non-linear function to the output vectors to produce non-linearized vectors, and convolving the non-linearized vectors with the basis vectors to produce separated signal components. Each vector may comprise a set of one-dimensional channel vectors. Separated signal components are combined to form an input signal reconstruction and an anomaly signal indicating deviation of the reconstruction from the associated input signal. Basis vectors are determined by training which involves use of weighting factors referred to as basis scales. When used to scale separated signal components in the production of reconstruction vectors, basis scales have the effect of reducing a mean squared error between such vectors and associated input data used to derive them.

53 Claims, 9 Drawing Sheets

Basis Vector Update Process

Continuous Adaption Training Of Basis Vectors

Matrix Inversion Method Of Determining Basis Scales

Gradient Descent Method Of Optimising Basis Scales

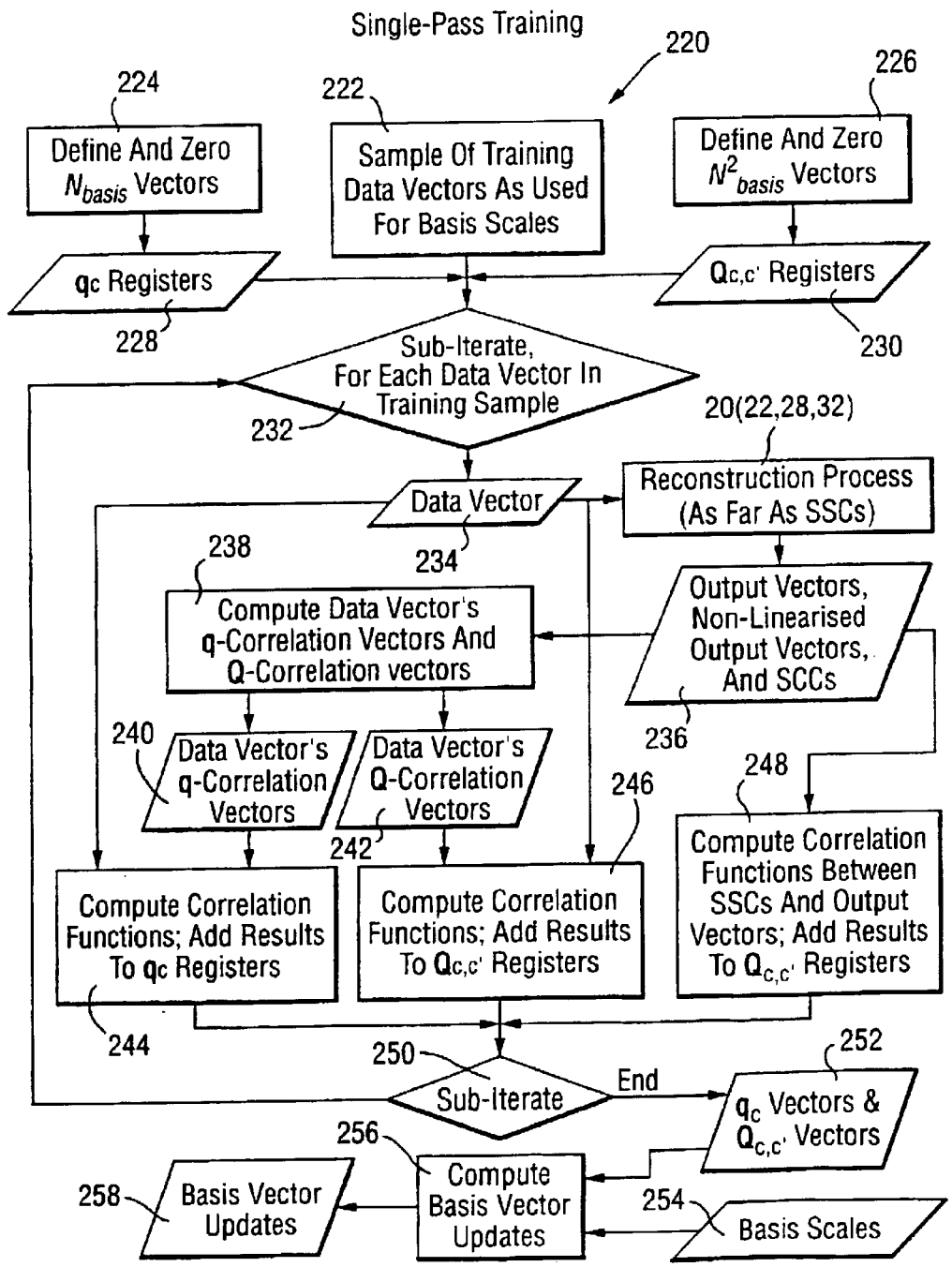

SIGNAL PROCESSING TECHNIQUE

This application is the U.S. national phase of international application PCT/GB01/00369, filed in English on 31 Jan. 2001 which designated the U.S. PCT/GB10/00369 claims priority to GB Application No. 0003571.7 filed 17 Feb. 2000. The entire contents of these applications are incorporated herein by reference.

BACKGROUND OF THE INVENTION

1. Field of the Invention

This invention relates to a signal processing technique, and also to a computer program and a computer system for implementing the technique.

2. Discussion of Prior Art

A common requirement in signal processing is to monitor signals from a dynamic system such as a machine and to carry out procedures such as anomaly detection, condition monitoring, fault detection, signal-to-noise enhancement, background suppression and blind signal separation. The last is also known as independent component analysis, and the expression "blind" indicates that signal separation is carried out without knowledge of or assumptions concerning signal properties. It produces what are known as "separated signal components" which correspond to characteristic features of a signal being monitored.

Many prior art procedures require either prior knowledge of the characteristics of the system to be monitored, or alternatively labelling, classification or previous analysis of training data. An example of this is supervised "back-propagation" training for multi-layer perceptrons disclosed by Rumelhart D E, Hinton G E & Williams R J. in "Learning Internal Representations By Error Propagation", which appears in Rumelhart & McClelland, Parallel Distributed Processing 1, MIT, 1986.

One known prior art technique in this area is referred to as "principal component analysis" or PCA: it may be defined as the process of determining eigenvectors of a covariance matrix of input data vectors, the matrix being obtained from subtracting the outer product of the mean data vector with itself from the mean outer product of each data vector with itself, in the conventional manner of statistics textbooks. The eigenvectors are a special case of parameters characterising a system and defined as "basis vectors" in standard texts on linear algebra. However, PCA is a linear technique and therefore cannot be used to extract features beyond a second order moment, i.e. higher-order features, or higher-order statistics. Many dynamical systems of interest in signal processing have higher-order statistics which cannot be extracted effectively by PCA. Similar remarks apply to linear neural networks such as linear perceptrons.

Rumelhart et al (ibid) and Minsky M L & Papert S A. *Perceptrons*, MIT, 1969 disclose non-linear perceptrons which it is known may be used to extract higher-order features. Moreover, this is an example of a neural network which implements a non-linear transformation of signals being processed. However, such techniques generally require prior knowledge, supervision, or manual labelling or classification of the training data, and even then do not necessarily extract practically useful or informative features. In this last regard convergence may occur at a false minimum remote from the solution that is useful in practice.

U.S. Pat. Nos. 5,377,306 and 5,453,940 are related patents disclosing an heuristic processor which is trained to fit training data to corresponding results empirically and then to use the form of the fit to predict hitherto unknown results using test data. Each describes deriving radial basis functions, these being functions of radial distances of input data from each of a set of origin points or centres: in a training mode the vectors are fitted to corresponding results by triangularisation of a matrix of these vectors; triangularisation is by a QR decomposition procedure used for solving an overdetermined set of linear equations and producing a least squares fit result. This determines a weight vector which when applied to a radial basis function provides an estimate of a corresponding result, which in turn can be compared with an actual result if available. Because the approach is non-linear it is suitable for extracting higher-order statistics; it provides signal reconstruction on the basis of training data and can be used for anomaly detection. However it suffers from the disadvantage that it is sensitive to the degree of time synchronisation of input signals, and also that only under certain circumstances does it extract useful features of the data.

SUMMARY OF THE INVENTION

The present invention provides a signal processing technique for generating separated signal components incorporating the steps of:

a) correlating basis vectors with input data to produce output vectors, b) applying a non-linear function to the output vectors to produce non-linearised vectors, and c) convolving the non-linearised vectors with the basis vectors to produce separated signal components.

The invention provides a number of advantages. It operates in a manner which is referred to in signal processing as "unsupervised": i.e. it is unnecessary to have prior knowledge of characteristics of signals from a system being monitored. Basis vectors may be provided from prior knowledge or estimation, or as will be described may be derived by a training process which itself is unsupervised. In the latter case the invention will adapt to unlabelled, unclassified and previously unseen training data and generate a model of the important features of the training data embodied in the basis vectors. Laborious manual labelling of the data is unnecessary.

In consequence, like the prior art technique of Principal Component Analysis (PCA), the invention may be used to monitor novel environments and designs. Unlike PCA, the algorithm is a non-linear technique, and can therefore model features of data of higher order than PCA.

The invention obtains relationships between input signal and basis vectors not from radial or scalar product measure but instead using correlation and convolution. When implemented on a conventional serial computer, the invention has the dual advantages of requiring relatively few computational steps and a relatively small usage of computer memory when appropriately implemented.

Prior art techniques deriving radial distances or scalar products are sensitive to synchronisation of input signals in time. In contrast, this invention uses correlation and convolution which provides both time invariance and the advantage that it does not require input signal synchronisation.

The invention is suitable for parallel implementations, for example a multi-processing parallel computer or an array of digital signal processing (DSP) devices; a further alternative is an optical or holographic computing device, particularly (although not exclusively) any such based on adaptive photorefractive volume-holographic crystals, because the adaptive photorefractive property may be used to implement training algorithms.

In the technique of the invention, convolution and correlation operations between pairs of one-dimensional time signals may be implemented by Fourier transforming the signals to the frequency domain to provide two sets of frequency components, in the case of correlation taking the complex conjugate of one such set, multiplying together the signals' frequency components or components and conjugates at each frequency to provide products, and then inversely Fourier transforming the products as prescribed by the well-known Convolution Theorem. Data and basis vectors may be multi-dimensional and the convolution and correlation operations may then be implemented by;

a) treating both data vectors and basis vectors as pluralities of one-dimensional time signals referred to as channel vectors, b) correlating or convolving each data vector channel vector with a corresponding basis vector channel vector by the aforesaid Fourier technique, and obtaining a plurality of one-dimensional correlation or convolution functions, and c) vectorially adding the correlation or convolution functions to produce a sum vector.

Separated signal components may be combined to form at least one result vector comprising at least one of a reconstruction of the input data vector and an anomaly vector indicating the reconstruction signal's deviation from the associated input data vector.

Basis vectors may be determined by a training process including:

a) arranging non-identical initial current values for basis vectors, b) operating the signal processing technique using the current values, c) deriving for each basis vector at least one respective correland signal for correlation with an associated signal selected from input data and said at least one result vector, d) for each basis vector, correlating the respective correland and associated signals to produce at least one respective correlation function, e) modifying each basis vector to form a respective new current value incorporating a contribution in accordance with the at least one correlation function associated with the respective correland, f) iterating steps (b) to (e) until the current values converge.

The contribution to a new current value may be proportional to the at least one correlation function, the constant of proportionality in this connection being referred to as the learning rate parameter.

The at least one correland signal may be at least one of:

a) an input data vector's correlation vector derived by applying the gradient of the said non-linear function to each element of an output vector and multiplying the vector so formed by an associated vector obtained from a correlation of basis and anomaly vectors, and b) an anomaly vector's correlation vector derived from a non-linearised output vector.

The at least one correland signal may be or include a data vector's correlation vector, the associated basis vector may be multi-dimensional, associated with a plurality of channels and give rise to a plurality of correlation functions when correlated with the anomaly vector, and prior to multiplication by the output vector the correlation functions may be reduced to a vector in one dimension by combining contributions of like time index from different channels.

The at least one correlation vector may be or include an input data vector's correlation vector and prior to multiplication by the said correlation function the output vector may be operated upon by the gradient of the non-linearisation function associated with non-linearised output vectors. After being operated upon as aforesaid and prior to multiplication by the said correlation function, the output vector may be multiplied by a respective weighting factor selected from quantities collectively referred to as basis scales and which when applied to respective reconstruction vectors having the effect of reducing a mean squared error between such vectors and associated input data used to derive them.

The at least one correlation vector may be or include an anomaly vector's correlation vector derived by multiplying elements of a non-linearised output vector by its respective basis scale.

The at least one correlation vector may be a plurality of correlation vectors, the technique including the step of computing correlation functions with such vectors, and the step of combining the resulting plurality of correlation functions, prior to modifying each basis vector to form a respective new current value.

Basis vectors may be determined by a batch-mode iterative procedure involving a training set of input data for use in the reconstruction process, and wherein a respective sub-set of the training set undergoes the reconstruction process in each iteration, iterations involve sub-iterations, in each of which a different member of the sub-set undergoes the reconstruction process, the basis vectors are modified after each iteration to form respective new current values incorporating multiple contributions derived from input data in the sub-set, each contribution being in accordance with the associated at least one correlation function associated with the respective correland.

Basis vectors may alternatively be obtained in a continuous adaptation iterative procedure wherein a different member of an input data set undergoes the reconstruction process at each iteration, and the basis vectors are modified after each iteration to form respective new current values incorporating a single contribution derived from that member, that contribution being in accordance with the associated at least one correlation function associated with the respective correland.

Alternatively, updates to basis vectors may be obtained in a single-pass training procedure by:

a) providing initial values of current basis vectors, b) deriving data vector's q-correlation and Q-correlation vectors from current basis vectors, output vectors, non-linearised output vectors and separated signal components, c) correlating the data vector's q-correlation vector with its associated data vector, d) correlating the data vector's Q-correlation vector with the associated data vector, e) correlating output vectors with separated signal components, such vectors and components having been derived from the associated data vector, f) repeating steps (c), (d) and (e) for successive data vectors, g) adding correlations involving data vector's q-correlation vectors, h) adding correlations involving data vector's Q-correlation vectors and output vectors, and i) deriving contributions to basis vectors from a quadratic function of basis scales including a linear term involving added correlations associated with data vector's q-correlation vectors and subtracted therefrom a quadratic term involving other added correlations.

The number of input data items in each sub-set may be at least as great as the number of basis vectors and each sub-set may be selected randomly from the training set avoiding re-use of a small sub-set or of highly correlated subsets.

The separated signal components may be combined to form at least one result vector by multiplying separated signal components by respective basis scales and adding resulting products by vector addition.

Basis scales may be computed by calculating over an input data set:

a) a mean value of vectors comprised of scalar products between input data vectors and associated separated signal components, b) a mean value of matrices comprised of scalar products between separated signal components associated with individual input data items, c) an inverse of the mean scalar product matrix, and d) a product of the inverse matrix and the mean scalar product vector, the product being a vector having elements which are basis scales.

Basis scales may alternatively be computed by:

a) arranging non-identical initial current values for basis scales, b) calculating a respective scalar product of an anomaly vector with each separated signal component associated with a like input data item, c) modifying each basis scale to form a respective new current value incorporating a contribution in accordance with the scalar product associated therewith, and d) iterating steps (b) and (c) for successive data items.

The non-linear function applied to the output vectors may be a threshold function which is small for small argument values and begins to grow quickly for near threshold argument values; it is preferably not sharp but relatively smooth and continuous, and preferably does not become exactly zero for argument values less than the threshold value. It may asymptote exponentially towards zero for argument values less than the threshold value, and may be a sigmoid function.

In another aspect, the present invention provides a computer program for controlling operation of a computer system and providing for generation of separated signal components by a procedure incorporating the steps of:

a) correlating basis vectors with input data to produce output vectors, b) applying a non-linear function to the output vectors to produce non-linearised vectors, and c) convolving the non-linearised vectors with the basis vectors to produce separated signal components.

The computer program of the invention may also provide for implementation of other features of the signal processing technique of invention as aforesaid.

In a further aspect the present invention provides a computer system programmed with a computer program as aforesaid.

In a still further aspect the present invention provides a computer system programmed to generate separated signal components by a processing technique incorporating the steps of:

a) correlating basis vectors with input data to produce output vectors, b) applying a non-linear function to the output vectors to produce non-linearised vectors, and c) convolving the non-linearised vectors with the basis vectors to produce separated signal components.

The computer system of the invention may also be programmed to provide for implementation of other features of the signal processing technique of invention as aforesaid.

BRIEF DESCRIPTION OF THE DRAWINGS

In order that the invention might be more fully understood, an embodiment thereof will now be described, by way of example only, with reference to the accompanying drawings, in which:

FIG. 9 is a flow diagram of a procedure for training basis vectors without deriving reconstruction, anomaly or correlation vectors,

DETAILED DISCUSSION OF EMBODIMENTS

Figure 1:
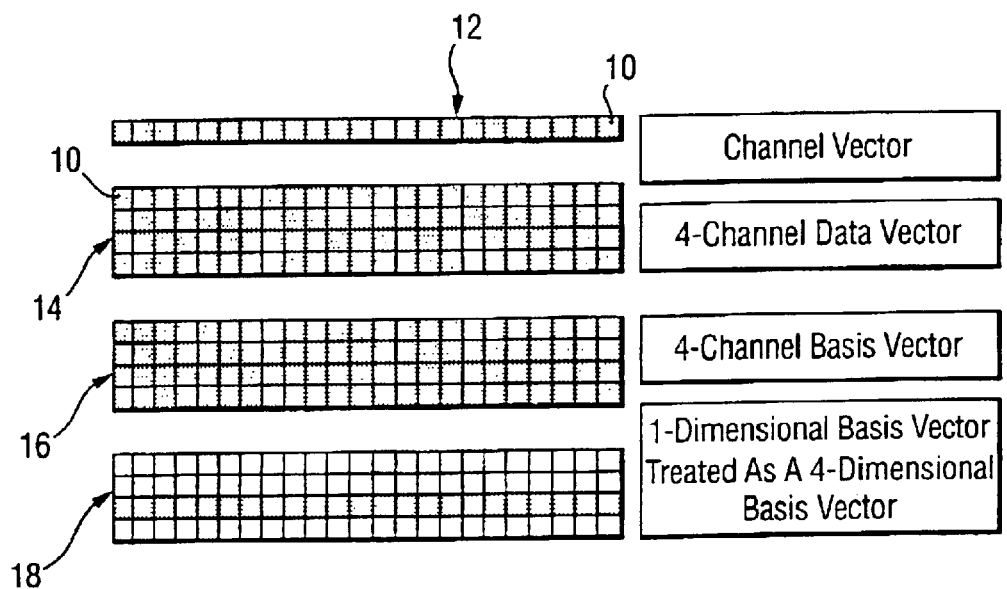
FIG. 1 illustrates the relationship between channels and data vectors in one and four dimensions.

Referring to FIG. 1, data elements output from sensors (not shown) are indicated by squares such as 10 and are produced at a constant sampling rate, i.e. with equal time intervals between successive samples or elements. Time increases to the right in the drawing, and so the leftmost data element is the earliest obtained. A single sensor produces a single data element 10 at any sampling time interval, and is associated with a single channel 12. Multiple sensors monitoring parameters of a system (not shown) produce multiple data elements 10 at such an interval; they are associated with multiple channels in parallel, of which four are shown at 14. Each channel contains a single time-varying signal represented by a sequence of data elements, and the signal may be from a sensor in real time or a recording of such a signal. The signal is digitised if processing is to be implemented digitally, but it may also be analogue provided that it is in a suitable form for convolution and correlation procedures in the time domain. Devices for digital and analogue convolution/correlation are known: e.g. for the former correlator/convolver integrated circuits or digital computers and for the latter Hall Effect, surface acoustic wave or optical devices. Convolution and correlation are implemented by the same processing devices because they are very similar—a digital correlator/convolver is described in U.S. Pat. No. 4,885,715 for example.

Each one-dimensional sequence or row of data elements (one at 12 and four at 14) will be referred to as a channel vector, 12 being a data vector consisting of a single channel vector. These are of finite length (i.e. number of data elements) because they are obtained using a constant sampling rate during a prearranged period of time T measured in units equal to the sampling time interval between generation of successive data elements. As illustrated T=23. The data elements might be obtained for example from an electric motor with signals monitored simultaneously from magnetic field sensors located at various points on the motor's stator. A number $N_{sensors}$ of sensors produces $N_{sensors}$ one-dimensional channel vectors which may collectively be regarded as a single $N_{sensors}$-dimensional data vector. One sensor is of course a special case of $N_{sensors}$ sensors (i.e. $N_{sensors}=1$). It is emphasised that this terminology for vector dimensionality does not refer to the time dimension in which data is sampled; a one-dimensional vector spanning T time samples is represented by T numbers (a row of data elements), and in the case of an $N_{sensors}$-dimensional vector spanning T time samples ($N_{sensors}$ rows of data elements) it would be represented by an ordered list of $TN_{sensors}$ numbers.

Each data vector 12 or 14 is associated with a respective basis vector of like dimensionality and number of channel vectors: a four-dimensional (4-D) basis vector (i.e. having four channel vectors) is shown at 16 for the data vector 14. As will be described later in more detail, basis vectors may be derived in a training procedure and characterise the principal features of data used in training. The procedure for $N_{sensors}$-dimensional basis vectors may be converted to one-dimensional equivalents by constraining co-ordinates to be zero for every channel except one as indicated at 18. This also applies to other $N_{sensors}$-dimensional vectors to be produced in the course of operation of the invention. Thus, the procedure for 1-dimensional basis vectors is a special case of the procedure for $N_{sensors}$-dimensional basis vectors.

Figure 2:
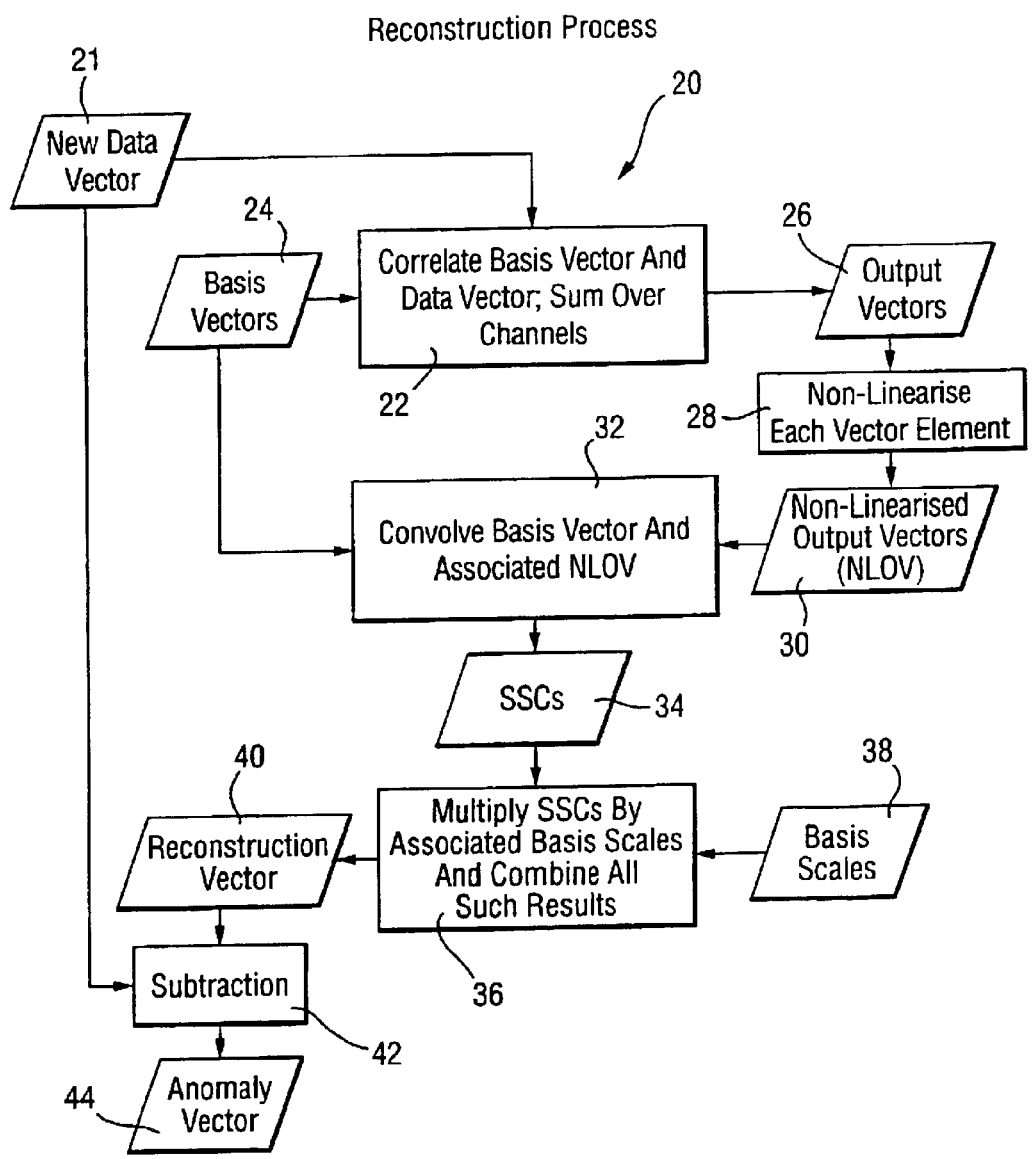
FIG. 2 is a flow diagram of a reconstruction procedure of the invention.

Referring now to FIG. 2, a procedure of the invention in a monitoring phase of operation is indicated generally by 20; it is illustrated in brief overview in block diagram form: in this specification, the convention adopted is that diamonds (see later drawings) indicate iterative repetition, parallelograms indicate input and output signals and rectangles indicate processes. Sub-procedures necessary to generate inputs used in the procedure 20 will be described later. Two of these are needed, one being to provide basis vectors, which embody a model of the characteristics of the system being monitored by the sensors. Basis vectors may be derived from knowledge of a system or alternatively they may be determined from training data using all or part of the procedure 20 together with additional steps to be described later. Basis vectors are analogous to eigenvectors of a linear system, but in the present case they differ in that they are derived by a process which involves a non-linearity. If the non-linearity were to be removed they would reduce to eigenvectors. A further desirable but not essential input is a set of basis scales, these being weighting factors derivable in such a way that they would minimise the mean squared error of a set of reconstruction vectors produced by the process 20 as compared to respective input data vectors from which they were derived.

Each basis vector may be one-dimensional or multi-dimensional; if one-dimensional, it may be associated with a respective channel. One or more one-dimensional basis vectors may be associated with a respective channel. They may alternatively be multi-dimensional, and associated with data vectors of the same dimensionality and have a number of channels equal to that dimensionality.

In a first step 22 of the procedure 20, a new or current data vector 21 is input and a respective one-dimensional correlation function is determined for this vector with each basis vector 24 in turn. Correlation of multi-dimensional data and basis vectors is treated as a set of channel pairs giving a set of one-dimensional correlations in the time dimension which are subsequently summed; i.e. $i^{th}$ data vector channel vector is correlated with the $i^{th}$ channel vector of the associated basis vector, and this is repeated for all $N_{sensors}$ channels or values of i to give a respective $i^{th}$ one-dimensional correlation function for each data/basis vector dimension or channel i. These $N_{sensors}$ correlation functions are then vectorially added together: i.e. like time-indexed coefficients of the $N_{sensors}$ one-dimensional correlation functions are summed to produce a one-dimensional vector of sums. If instead the basis vector and data vector are only one-dimensional, the correlation function computed between these two one-dimensional vectors will already be one-dimensional without the need for summation over channels. (As has been mentioned, the case of one-dimensional basis vectors is a special case of $N_{sensors}$-dimensional basis vectors, in which all channels of the basis vector except one are zero-valued. Consequently, all $N_{sensors}$ correlation functions except one would be zero-valued, and summing over channel index produces the same result as if only the non-zero channel were selected for correlation.)

If the correlation is carried out using a serial computer, each of the aforementioned one-dimensional correlation functions may be performed most efficiently by Fourier transforming each associated pair of one-dimensional channel vectors to the frequency domain using the well-known fast Fourier transform (FFT) algorithm, complex-conjugating the frequency components of the Fourier-transformed channel vector associated with the basis vector, then producing products by multiplying the conjugated frequency components component-wise with the frequency components of the Fourier-transformed channel vector associated with the data vector, then inverse Fourier transforming the products to the time domain. In this connection, component-wise multiplication of two vectors a and b having respective elements or components $a_i$, $b_i$ (i=1, 2, 3, ... etc) is defined as forming a vector c with an $i^{th}$ element $c_i$ which is a product $a_i b_i$ of like-indexed pairs of elements $a_i$, $b_i$ and repeating for all elements or values of i.

Exploiting the well-known FFT algorithm, this correlation procedure takes in the order of $T\log_e T$ operations, where T is the number of time-samples in each channel, whereas carrying out correlation without the use of Fourier transforms would require of the order of $T^2$ operations; for large T it represents a very considerable saving in computer operations. If optical processing techniques are used, the Fourier transform is derived naturally and instantaneously by the physical process of optical diffraction.

Summarising in terms of equations, the one-dimensional correlation function between the $i^{th}$ sensor channel (the $i^{th}$ sensor) of a data vector x and the $i^{th}$ channel of the $c^{th}$ basis vector $w_c$ is given by the following expression when using the above Fourier transform procedure:

$$cor(x_{i,sensor}, w_{c,i,sensor}) = F^{-1}(F(x_{i,sensor}) \times (F(w_{c,i,sensor}))^*) \quad (1)$$

where F and $F^{-1}$ indicate the operation of Fourier transformation and its inverse respectively, ( )* denotes a complex conjugate of the term in parentheses and × denotes component-wise multiplication. For basis vectors and data vectors which are $N_{sensors}$-dimensional, as described above correlation at 22 generates a respective set of $N_{sensors}$ one-dimensional correlation functions for each basis vector. The correlation functions for each basis vector are added vectorially: i.e. the $t^{th}$ time-sample of the $i^{th}$ correlation function is added to the $t^{th}$ time-sample of each of the other correlation functions associated with that basis vector, and this is repeated for all t=1 to T to yield a one-dimensional vector of T time-samples given by:

$$\sum_{i=1}^{Nsensors} (cor)_{i_{sensor},t} \quad (t = 1, \ldots, T) \qquad (2)$$

The summation is over channels 14, not over the time dimension. This produces a set of one-dimensional output vectors at 26 each with T elements and each associated with a respective basis vector. In the one-dimensional case one respective correlation function is associated with each basis vector, and it becomes a member of the set of output vectors 26 as described above. Output vectors are therefore one-dimensional in both cases: they have a time index but not a channel index.

The next step in the procedure 20 is non-linearising output vectors at 28. Every element of each output vector is operated upon by a non-linear function—the sigmoid function—to produce a set of non-linearised one-dimensional output vectors each associated with a respective basis vector. Non-linearisation is necessary for modelling any characteristic of the input data vectors more subtle or useful than their second-order moments or statistics. A special case of the sigmoid function r(a) of a variable a—called the logistic—is defined by:

$$r(a) \propto \left[1 + \exp\left(\frac{a - \theta}{s}\right)\right]^{-1} \qquad (3)$$

where $\theta$ represents a threshold value, and the smallness of s determines how sharp the threshold transition is. The logistic function asymptotes exponentially towards zero in its sub-threshold region and towards unity for large values of the parameter a. Other kinds of non-linear function may also be employed as discussed later. To non-linearise an output vector, Equation (3) is evaluated with r(a) in turn replacing each vector coefficient a, yielding successive coefficients of a non-linearised output vector.

In all equations, scalar quantities are indicated by italic font; matrices and vectors are indicated by bold font; the $c^{th}$ basis vector is denoted by $w_c$, and in common with data vectors x it has two indices $i_{sample}$ and $i_{sensor}$: of these the second index $i_{sample}$ has values 1 to $N_{samples}$ which denotes the total number of time-samples in the sequence of samples being processed; the first index $i_{sensor}$ has values 1 to $N_{sensors}$ which denotes the number of sensors being monitored. The number of basis vectors is denoted by $N_{basis}$. Each basis vector consists of a number $N_{sensors}$ of one-dimensional channel vectors each associated with respective sensors: the channel vector of the $c^{th}$ basis vector associated with a sensor of index $i_{sensor}$ is denoted by $w_{c,i_{sensor}}$.

Summarising in equation form the procedure indicated by 22 to 30, the $c^{th}$ non-linearised output vector $r_c(x)$, computed for data vector x, is given by:

$$r_c(x) = r\left(\sum_{i_{sensor}=1}^{N_{sensors}} cor(x_{i_{sensor}}, w_{c,i_{sensor}})\right) (c = 1, \ldots, N_{basis}) \qquad (4)$$

where the non-linear function r(a)—a representing the summation term in Equation (4)—is given in Equation (3), and the one-dimensional vector $x_{i_{sensor}}$ represents the $i^{th}$ channel of the $N_{sensors}$-dimensional input data vector x.

The set of non-linearised output vectors appears at 30, and they are fed to a convolution stage 32 together with the associated basis vectors from stage 24. A convolution function is computed between each non-linearised output vector and its corresponding basis vector: this produces for each basis vector a respective separated signal component.

Each non-linearised output vector and its corresponding basis vector are real-valued and time sampled. The convolution function between them when basis vectors are one-dimensional is computed in a similar fashion to correlation by:

(a) taking one-dimensional Fourier transforms of both vectors;

(b) multiplying these Fourier transforms together component-wise; and (c) taking the inverse Fourier transform of the resulting product, to yield a real-valued, one-dimensional vector which is both the convolution function and the separated signal component at 34.

In the more general case where basis vectors are $N_{sensors}$-dimensional, the convolution function $cnv(r_c, w_{c,i_{sensor}})$ between the $c^{th}$ non-linearised output vector $r_c$ and its corresponding basis vector $w_c$ is given by:

$$cnv(r_c, w_{c,i_{sensor}}) = F^{-1}(F(r_c) \times F(w_{c,i_{sensor}})) \qquad (5)$$

where as before F and $F^{-1}$ indicate Fourier transformation and its inverse and × denotes component-wise multiplication. This more general case clearly includes the special case $N_{sensors}=1$ described above.

For one-dimensional basis vectors, convolutions with respective non-linearised output vectors are one-dimensional, and separated signal components associated with respective basis vectors are also one-dimensional. For multi-dimensional basis vectors, convolution is carried out using each individual row or channel of a basis vector in turn; For each basis vector this yields a set of $N_{sensors}$ convolution functions each associated with a respective one of the $N_{sensors}$ channels 14. In a multi-dimensional case, a separated signal component is itself a multi-dimensional vector with the same dimensionality.

Each separated signal component 34 is a reconstruction of that component of the current data vector which is modelled by the corresponding basis vector. In the one-dimensional case it is a reconstruction of that component of a channel vector which is modelled by the corresponding one-dimensional basis vector. In the general $N_{sensors}$-dimensional case it is a reconstruction of that component of an $N_{sensors}$-dimensional data vector which is modelled by a corresponding $N_{sensors}$-dimensional basis vector. It is a result of interest for an electronic signal processing technique of blind signal separation (also known as independent component analysis), because the input signal is separated into component parts each modelled by a respective basis vector.

Separated signal components 34 are passed to a reconstruction step 36, which also receives a current version of a set of basis scales, of which there is one for each component. Basis scales are as has been said weighting values which when optimised minimise the mean squared error of a set of reconstruction vectors as compared to data vectors from which they were derived, although optimisation may not be essential in many cases. In this step, all the separated signal components, one for each basis vector, are combined together to produce a reconstruction of the current data vector, referred to herein as a reconstruction vector and having as many dimensions as there are channels 12 or 14.

The preferred method of combining separated signal components is weighted linear summation: i.e. each separated signal component is multiplied or weighted by a respective basis scale each of which is a number associated with a respective basis vector. It has the advantage that basis scales can be determined directly as will be described later, i.e. without the need for an adaptive approach. Weighted components are produced in this way from each signal component, and they are summed by vector addition to produce a composite which is the reconstruction vector 40. It is not essential to have weighting with basis scales but if correctly implemented it greatly improves sensitivity and performance.

Summarising in equation form the procedure indicated by 32 to 42, an $i^{th}$ channel vector $(X(x))_{i_{sensor}}$ of a reconstruction vector associated with the $i^{th}$ sensor and input data vector x is given by:

$$(X(x))_{i_{sensor}} = \sum_{c=1}^{N_{basis}} a_c cnv(w_{c,i_{sensor}}, r_c(x)) \quad (6)$$

where $a_c$ is a basis scale associated with the $c^{th}$ basis vector and other expressions are as defined for Equation (4).

The reconstruction vector 40 is a result of particular interest for applications such as signal-to-noise enhancement and background suppression in which the training data contain many exemplars of a signal being monitored. This is because the procedure 20 develops a trained model embodied in the basis vectors and basis scales, and for each new input signal it uses this model to reconstruct an estimate of that signal built out of important features built into the model by input training data: the estimate is the reconstruction vector 40, which is the component of the input signal which can be encoded using the model's features, and in it important signal features are enhanced over background clutter. Thus reconstruction emphasises a modelled signal but reconstructs background clutter to a far lesser extent. Because of the non-linearity introduced at 28, the procedure 20 is a non-linear technique: it can therefore model much more subtle, important and useful features of the training data than can linear techniques such as principal component analysis.

The reconstruction vector 40 is particularly important for applications such as signal processing of images where it is relevant to background suppression and enhancement of required image features: in these applications, depending on the statistics of data used to train the procedure 20, it may be possible to model and reconstruct the image features, not the more random background. This result will be achievable if the data contain sufficient exemplars of the required image features: if not, the algorithm will adapt to model the clutter and the image features will be treated as the anomalous component.

The next step in the procedure 20 is an anomaly enhancement step 42. Here each reconstruction vector is compared with the input data vector from which it was derived.

The comparison produces an anomaly vector 44 with $N_{sensors}$ dimensions, i.e. as many as there are channels.

Although a number of comparison techniques may be used, the preferred method of comparison to produce the anomaly vector A(x) is vector subtraction, i.e.:

$$A(x)=x-X(x) \quad (7)$$

In order to compute a mean squared reconstruction error $<E>_{\{x\}}$ over a sample $\{x\}$ of training data vectors, one need only take the anomaly vectors derived from the sample, form a respective scalar product of each anomaly vector with itself, and produce an average $<E>_{\{x\}}$ over such products, i.e.:

$$<E>_{\{x\}}=<|x-X(x)|^2>_{\{x\}}=<A(x)\cdot A(x)>_{\{x\}} \quad (8)$$

where the 'dot' symbol signifies the scalar product operation. The embodiment described here minimises the value of this mean squared reconstruction error as the consequence of training, because the training performs gradient descent on this quantity.

The anomaly vector can be regarded as that component of the current input data vector which is not encoded by the trained model embodied in the procedure 20. It is the discrepancy between the current input vector or signal and the reconstruction of that signal using the model expressed in terms of basis vectors and basis scales built up from earlier data used in training. In condition monitoring and anomaly detection applications, this discrepancy is a result of interest because it contains the anomalous component.

In comparing input signals and corresponding model reconstructions, step 42 makes it possible to highlight, emphasise and detect anomalies in new data, that are uncharacteristic of data used in an earlier training procedure 20.

In addition to the steps of the procedure 20, other computations need to be done to adapt or train the basis vectors using a sample set of input data vectors. It is possible for the procedure 20 to be used for monitoring while training is in progress, i.e. the training phase need not be completed before the monitoring phase begins because the basis vectors can be adaptively updated as part of the monitoring process.

Basis vectors are produced or adapted by an iterative training or learning process. They may be produced by batch-mode training, which is most suited to implementations of the invention using a digital computer. Computer registers are used to accumulate updates to the basis vectors. In optical or other implementations not using a computer, there may be an averaging procedure which is not distinct from a zeroing step: in such implementations an analogue of zeroing may instead be achieved by physical memory decay; even in computer implementations, instead of explicit zeroing, decay may be used by applying a "forget factor" which reduces memory or register contents by a prearranged proportion on every cycle of operation.

Figure 3:
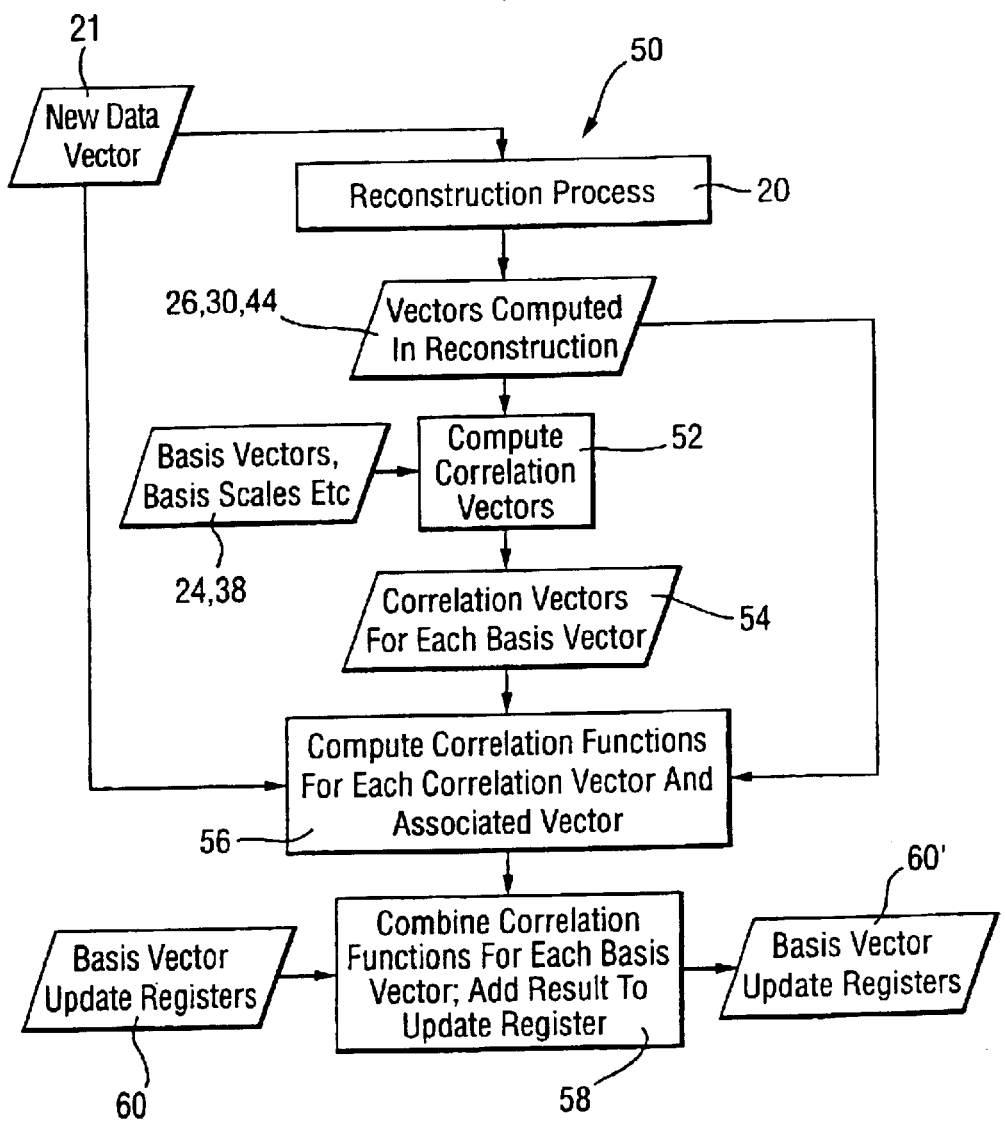
FIG. 3 is a flow diagram of a procedure for updating basis vectors for use in the reconstruction procedure of the invention shown in FIG. 1.

Referring now to FIG. 3, a block diagram is shown of a training procedure indicated generally by 50 for producing updates for basis vectors; as in FIG. 2 parallelograms indicate input and output signals and rectangles indicate processes, and parts described earlier are like-referenced.

The steps involved in the monitoring phase, i.e. the reconstruction procedure 20, are a subset of the steps involved in producing basis vectors. The reconstruction procedure 20 itself needs basis vectors 24 to operate, and these can be obtained by procedures of the invention to be described later: initially however such procedures have not been carried out. However it can be shown analytically that it does not matter what initial values are used for basis vectors in reconstruction 20 for training purposes, because the training procedure 50 produces basis vectors in a way which makes them converge to acceptable values irrespective of their initial values. They may for example be set to randomly chosen values initially, or alternatively to values that have previously been determined as at least approximating to those suitable for a system being monitored.

The procedure 20 is executed for successive vectors 21 belonging to a selected set of training data vectors. For each of these vectors, output vectors, non-linearised output vectors and anomaly vectors 26, 30 and 44 are obtained in the procedure 20; the latter are used in step 52 with basis vectors 24 and basis scales 38 to compute respective correlation vectors 54 for the data and anomaly vectors 21 and 44. This computation will be described in more detail later. The data and anomaly vectors' correlation vectors are so called because they are for use in computing correlation functions, not because they are the result of correlation operations. A respective correlation vector is associated with every data and anomaly vector, and it is one-dimensional. In other embodiments of the invention, it may only be necessary to compute one of the above correlation vectors, or it may be necessary to compute correlation vectors for the reconstruction vector or other vectors.

Each correlation vector 54 is correlated with its respective associated data vector 21 or anomaly vector 44 in step 56 to yield correlation functions as described in more detail later. When correlating two signals using FFTs as described earlier, it is necessary to complex-conjugate the Fourier transform of one signal but not the other, and in this case it is the correlation vector's Fourier transform which is to be complex-conjugated. In step 58, the $N_{sensors}$ correlation functions associated with each basis vector are combined by vector addition and added to the contents 60 of an update register associated with their basis vector. This converts the contents to an updated value 60'. A respective register (not shown) is associated with each basis vector, and register and vector have the same dimensionality. The registers' contents are initially zero for the first data vector used in each iteration of the training procedure 50, and thereafter are incremented as described above for each new data vector selected for the training procedure 50.

Figure 4:
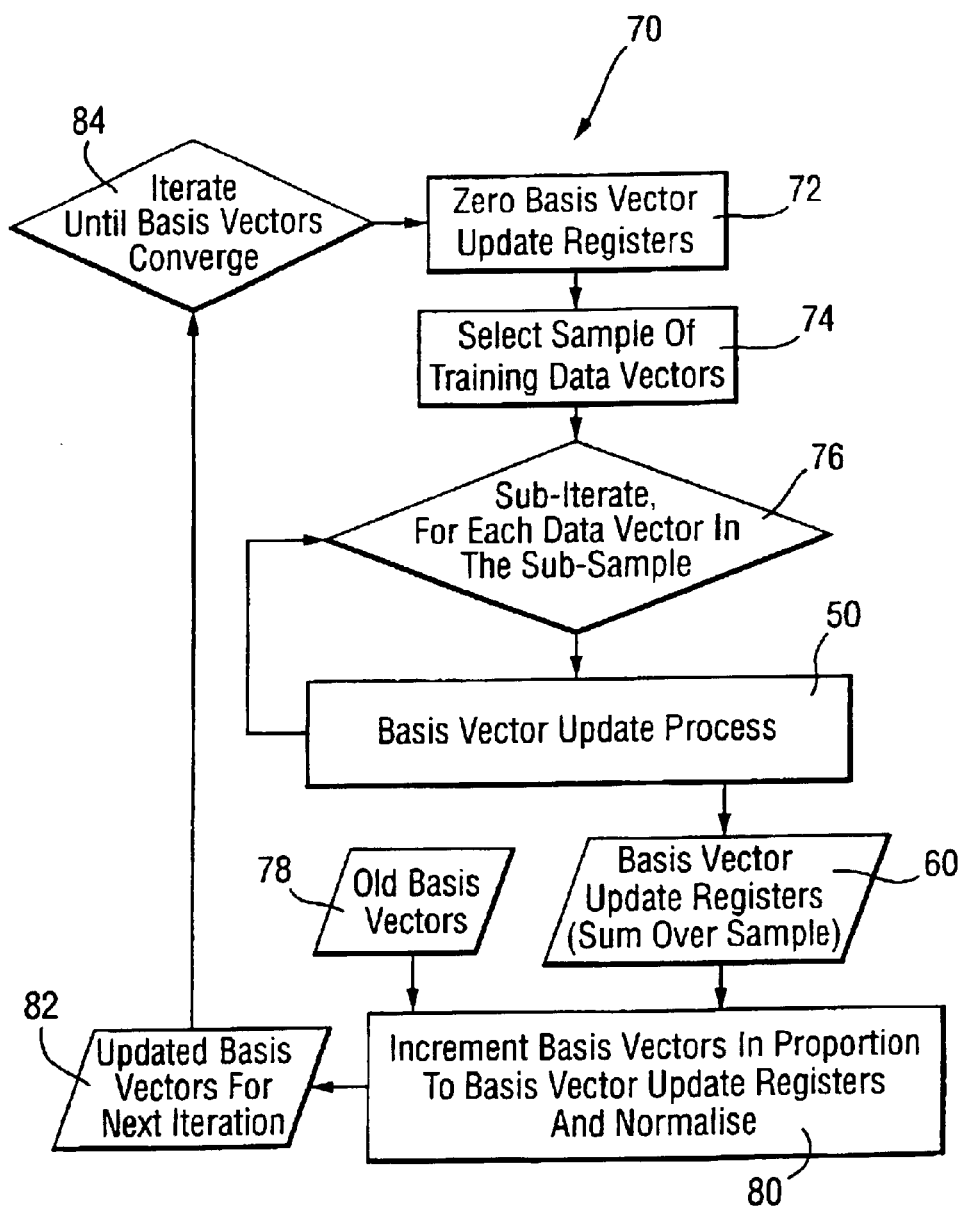
FIG. 4 is a flow diagram of a batch mode procedure for training basis vectors for use in the procedure of FIG. 3 for updating basis vectors.

Referring now also to FIG. 4, a block diagram is shown of a procedure indicated generally by 70 for updating basis vectors by a batch-mode training approach. Elements described earlier are like-referenced. This is the preferred process for updating the basis vectors in serial computer implementations. At 72 update registers are set initially to zero and a sample of the training data vectors is chosen at 74, i.e. only a sub-set of the latter are used in order to reduce training time. The update process 50 is then sub-iterated for every vector in the sample, and the update registers accumulate contents 60 accordingly. Mathematical expressions for this are given later together with those for other quantities required in the procedure. The basis vectors 78 are updated at 80 by incrementing them in small amounts to a degree which is proportional to the update register contents, the constant of proportionality in this connection being positive and fixed and referred to as the learning rate parameter. The basis vectors are then normalised by being scaled in length and are then the vectors 82 for the next iteration 84. To carry out normalisation, the lengths of the basis vectors $w_c$ are computed from:

$$|w_c|^2 = \sum_{i_{sensor}=1}^{N_{sensors}} w_{c,i_{sensor}} \cdot w_{c,i_{sensor}} \qquad (9)$$

where the 'dot' symbol signifies the scalar product operation as before.

Equation (9) is the sum of squared vector lengths, and an appropriated normalisation factor is obtained by taking its square root: each basis vector channel vector $w_{c,i_{sensor}}$ is then scaled in length by multiplying it by:

$$\text{Normalisation Factor} = 1/\sqrt{|w_c|^2} \qquad (10)$$

The iterative cycles eventually converge, i.e. the basis vectors cease to change significantly from one sample to the next. Convergence may be judged by a criterion such as the mean square reconstruction error becoming less than a prearranged value, or simply after a predetermined number of iterative cycles. The training phase is then terminated and the monitoring phase or procedure 20 can begin.

Each iteration may involve a limited sample of the set of training data vectors, and the basis vectors are then updated after this sample has been processed. Iteration will often be confined to samples because use of a whole training data set may be too time consuming. The sample should be changed at each iteration, and it should in each case be a randomly selected sub-set of the training data vectors, to encourage the trained model to be statistically representative of as large a population of data vectors as possible. Here the expression "iteration" is used to mean passage of all data vectors in a training sample through a training procedure, passage of one such vector being referred to as a sub-iteration.

Figure 5:
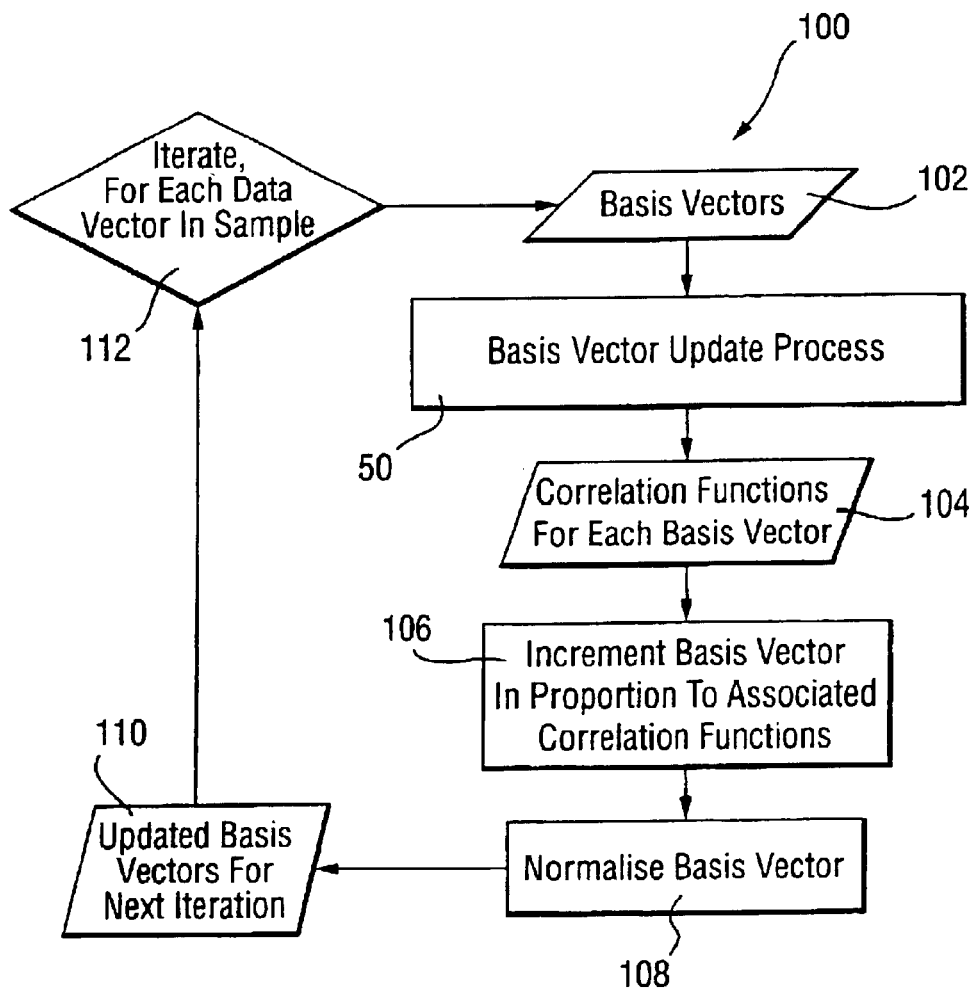
FIG. 5 is a flow diagram of a continuous mode procedure for training basis vectors for use in the procedure of FIG. 3 for updating basis vectors.

Referring now also to FIG. 5, a block diagram is shown of a procedure indicated generally by 100 for updating basis vectors by continuous adaptation training, which is an alternative to batch-mode training. Elements described earlier are like referenced. The procedure 100 is suited to optical implementations of the invention. Instead of storing updates in registers, the basis vectors themselves are updated by very small amounts after each training data vector is processed. This may be more suitable for optical implementations than batch-mode training, because continuous adaptation of basis vectors might conveniently be implemented using adaptive holographic media such as photorefractive crystals.

For each training data vector input during the iteration, as before the data and anomaly vectors' correlation vectors associated with each basis vector are computed in the update process 50 using the current basis vectors 102. The correlation function between each correlation vector and the data or anomaly vector with which it is associated is also computed. At 106, the correlation functions 104 associated with each basis vector are then combined, and each basis vector is incremented to a degree which is equal to this combination multiplied by the learning rate parameter. After normalisation at 108, the basis vectors 110 are used for the next sub-iteration 112 using another input data vector.

A procedure for computing correlation vectors will now be described. It can be shown that this process guarantees that the basis vectors will inevitably converge to a configuration which minimises the mean squared length of the anomaly vector averaged over the set or sub-sample of data vectors used for training. Apart from statistical fluctuations, the training technique continuously reduces this length until it reaches a minimum. The shortness of this length is a measure of the accuracy of the model, and so the model must be more accurate after training than before. Other processes for computing the correlation vectors will not guarantee this property, but may be more convenient for optical implementations to derive, or faster for serial computer simulations.

Figure 6:
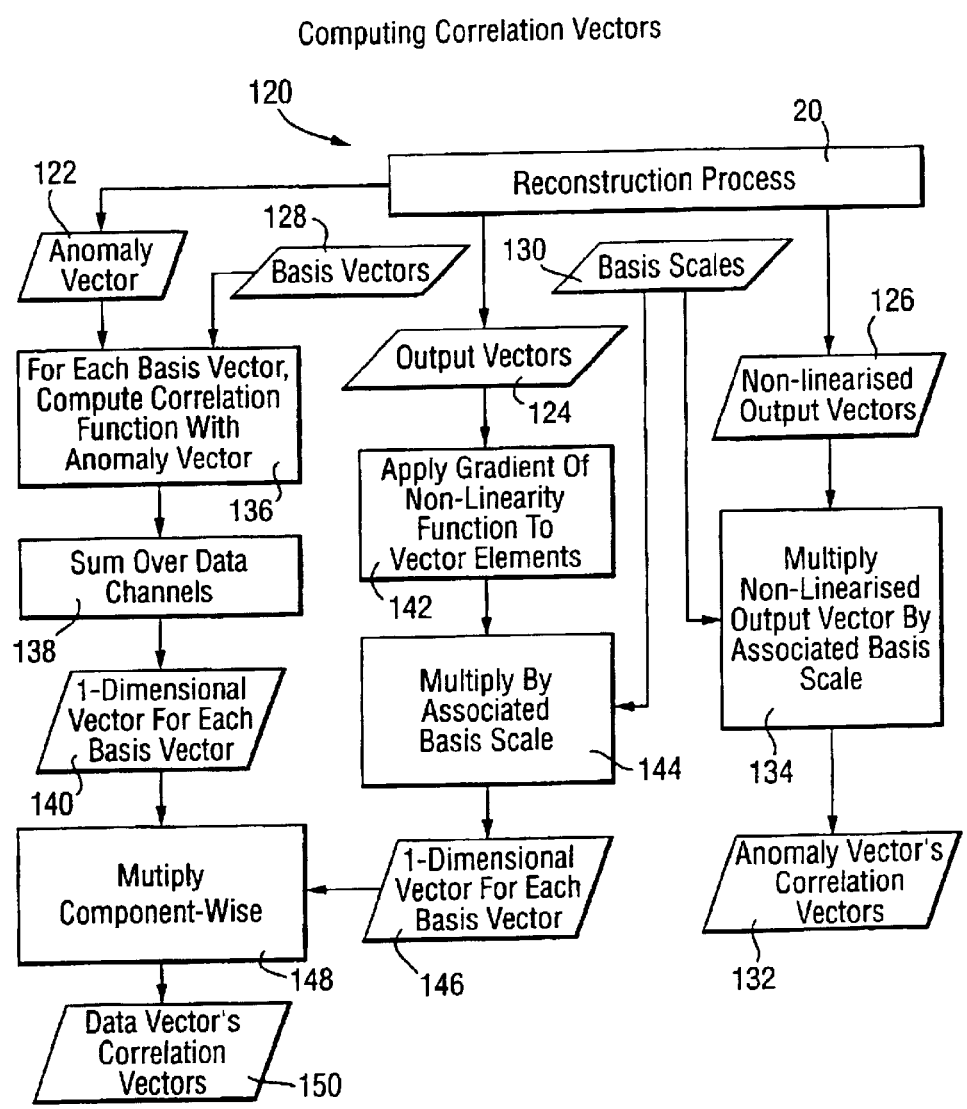
FIG. 6 is a flow diagram of a procedure for computing correlation vectors for use in the procedure of FIG. 3 for updating basis vectors.

Referring now to FIG. 6, in which elements described earlier are like referenced, a block diagram is shown of a procedure indicated generally by 120 for calculating the anomaly and data vectors' correlation vectors. This is a preferred but not essential feature of the invention. There is one of each these two correlation vectors associated with every basis vector and it is one-dimensional. They are called correlation vectors because they are correlands—which for the purposes of this specification means "items to be correlated": i.e. they are for use in a correlation operation as opposed to being generated in one such. The reconstruction process 20 is used to generate anomaly vectors, output vectors and non-linearised output vectors 122, 124 and 126, and these are used in conjunction with basis vectors and scales 128 and 130. The anomaly vector's correlation vector 132 is computed at 134 by multiplying each non-linearised output vector by the basis scale associated with the corresponding basis vector component-wise (as defined earlier): i.e. each element of a non-linearised output vector $r_c(x)$ is multiplied by the corresponding basis scale $a_c$ to yield an element of an anomaly vector's correlation vector $avcv_c(x)$, i.e.:

$$avcv_c(x) = a_c r_c(x) \tag{11}$$

The data vector's correlation vector is computed as follows: the correlation function between the anomaly vector and every basis vector is computed at 136 as described earlier to generate a one-dimensional vector $g_c(x)$ associated with every basis vector; in the case of an basis vector with $N_{sensors}$ dimensions, $N_{sensors}$ correlation functions are produced at 138 and summed by vector addition to reduce them to one at 140. In computing correlation functions between two signals, as mentioned earlier Fourier transforms of one of the signals (but not the other) are required to be complex conjugated, and in the present case it is the complex conjugates of basis vectors' Fourier transforms that are employed.

Every element of every output vector 124 is operated upon at 142 by that function which is the derivative or gradient dr/da of the non-linear function r(a) used in the reconstruction process 20; i.e. the element is substituted for a in dr/da and then the latter is evaluated to yield a new element. This generates elements of a respective one-dimensional vector of gradients $r_c(x)$ associated with each basis vector, and it is multiplied at 144 by the basis scale associated with the relevant basis vector to yield another one-dimensional vector 146. Applying the function dr/da is not essential but guarantees that the training process will monotonically reduce the mean squared length of the anomaly vector. The two one-dimensional vectors 140 and 146 respectively generated by correlation and by applying the function dr/da are multiplied together component-wise (as defined earlier) at 148, and the resulting product is the data vector's correlation vector 150.

In mathematical terms, the ($c^{th}$) data vector's correlation vector $dvcv_c(x)$ is given by:

$$dvcv_c(x) = r'_c(x) \times g_c(x) \quad (c=1, \ldots, N_{basis}) \tag{12}$$

where × denotes component-wise multiplication as before and where $$g_c(x) \equiv \sum_{i_{sensor}=1}^{N_{sensors}} cor((x - X(x))_{i_{sensor}}, a_c w_{c,i_{sensor}}) \tag{13}$$

$$(c = 1, \ldots, N_{basis})$$

and $r'_c(x)$ is the vector of gradients, i.e. r'(a)≡dr/da, given by:

$$r'\left( \sum_{i_{sensor}=1}^{N_{sensors}} cor(x_{i_{sensor}}, w_{c,i_{sensor}}) \right) (c = 1, \ldots, N_{basis}) \tag{14}$$

These expressions are used to increment the current contents $bvur_{c,i_{sensor}}$ of the basis vector update registers as indicated at 60 in FIG. 4 so that, at the end of the iteration, their contents are determined by:

$$bvur_{c,i_{sensor}} = \langle cor((x - X(x))_{i_{sensor}}, avcv_c) \rangle_{\{x\}} + \tag{15}$$

$$\langle cor(x_{i_{sensor}}, dvcv_c) \rangle_{\{x\}}$$

where $(X(x))_{i_{sensor}}$ is the $i^{th}$ channel of a reconstruction vector associated with the $i^{th}$ sensor $i_{sensor}$ given by Equation (6) and repeated below for convenience:

$$(X(x))_{i_{sensor}} = \sum_{c'=1}^{N_{basis}} a_{c'} cnv(w_{c',i_{sensor}}, r_{c'}(x)) \tag{6}$$

Methods for determining basis scales will now be described. The preferred criterion for optimising the basis scales is to set them to that combination of values which will minimise the mean squared error of the reconstruction, this being the mean squared vector difference between reconstruction and data vectors, averaged over some sample of training vectors. That sample may be the full set of training data vectors, or some random subset drawn from it.

The matrix inversion method is the fastest way of computing the combination of basis scale values which will minimise the mean squared error of the set of reconstruction vectors with respect to input data vectors from which they were derived. Against this, and although slower, the iterative gradient descent method avoids the need to store and invert a matrix, which will be a large matrix if the number of basis vectors is large. Matrix inversion is the preferred method of optimising the basis scales in serial computer implementations. Gradient descent is the preferred method in optical computer implementations. Matrix inversion is not an iterative process but a single step (although it involves 'sub-iterations' to accumulate sample averages over a set of data vectors). As a result, it has the advantage of stability as well as speed: the computed optimal values do not oscillate around true optimal values as may occur with a gradient descent process if incremental updates are sufficiently large.

Matrix inversion method is preferable for serial computer implementations, provided memory resources are not limited. The gradient descent method may be preferable for serial computer implementations if memory resources are limited, and its incremental adaptive nature may be better suited to the physics of optical computing devices, such as adaptive photorefractive crystals.

The gradient descent method is necessary if the separated signal components are combined in any way other than (weighted) linear summation. The matrix inversion method is not valid if the reconstruction combines the separated signal components in a non-linear way. If the separated signal components are combined in a non-linear way, the steps of the gradient descent method must be modified to take the non-linearity into account. Those familiar with gradient descent methods of optimisation will be able to deduce the modifications necessary, but those modifications are not set out explicitly here because they do not change the nature of the invention in a fundamental way.

Figure 7:
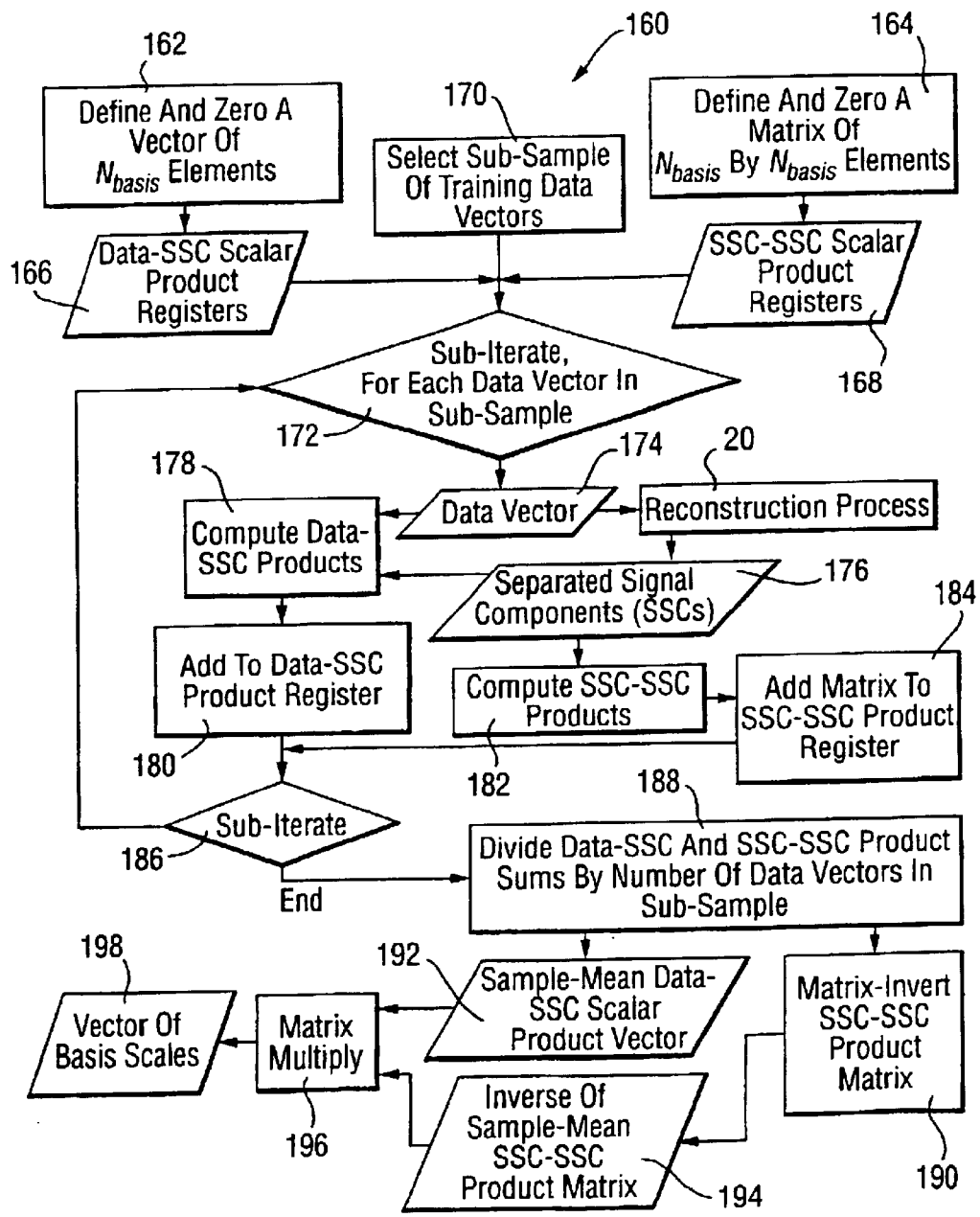
FIG. 7 is a flow diagram of a matrix inversion procedure for computing basis scales for use in the reconstruction procedure of the invention shown in FIG. 1.

Referring now to FIG. 7, a block diagram is shown of a procedure indicated generally by 160 for calculating basis scales by the matrix inversion method. This is a preferred approach for implementations of the invention using a conventional serial computer. Elements described earlier are like referenced. At 162 and 164 a vector with $N_{basis}$ elements and an $N_{basis}$ by $N_{basis}$ matrix with $N_{basis}^2$ matrix elements are defined each with all elements initially set to zero: here $N_{basis}$ is the number of basis vectors. The $N_{basis}$ element vector has elements each of which accumulates a sample average of a scalar product of a data vector with a separated signal component (SSC) and the $N_{basis}$ by $N_{basis}$ matrix has elements each of which accumulates a sample average of a scalar product 168 between a respective pair of SSCs. The $N_{basis}$ element vector and $N_{basis}$ by $N_{basis}$ matrix are accumulated in their respective update registers. At 170 a sample is selected from available training data vectors, the sample being the same as that used in a single iteration of training. Iteration at 172 provides a training data vector 174 for input to the reconstruction process 20 which generates $N_{basis}$ SSCs 176 from it.

The scalar product between the training data vector 174 and each of the SSCs is computed at 178 to form $N_{basis}$ scalar products which are added at 180 to the contents 166 of the appropriate data-SSC scalar product update registers. Similarly, scalar products between pairs of SSCs are computed at 182 and added at 184 to the contents 168 of the SSC-SSC scalar product update registers. The next sub-iteration is initiated at 186 so that the next vector in the training sample is processed through steps 20 and 178–184. The procedure continues with successive sub-iterations until all the data vectors in the training sample have been processed and contents 166 and 168 have accumulated in respective update registers; both register contents 166 and 168 are then divided by the number of vectors in the training sample at 188, and the $N_{basis}^2$ averaged SSC-SSC scalar products constitute an $N_{basis}$ by $N_{basis}$ matrix which is inverted at 190. For the training sample, this provides a mean data-SSC scalar product vector 192 and an inverse matrix 194 which are multiplied together at 196 to produce a vector 198 having elements $a_c$ which are the optimum values of the $N_{basis}$ basis scales given by:

$$a_c = \sum_{c'} (M^{-1})_{cc'} \left\langle \sum_{i_{sensor}=1}^{N_{sensors}} x_{i_{sensor}} \cdot cnv(w_{c',i_{sensor}}, r_{c'}(x)) \right\rangle_{\{x\}} \quad (16)$$

where $(M^{-1})_{cc'}$ represents the inverse of the $N_{basis}$ by $N_{basis}$ matrix referred to above, the 'dot' symbol signifies the scalar product operation as before, and other parameters are as previously defined. The matrix itself is $M_{cc'}$ given by:

$$M_{cc'} = \left\langle \sum_{i_{sensor}=1}^{N_{sensors}} cnv(w_{c,i_{sensor}}, r_c(x)) \cdot cnv(w_{c',i_{sensor}}, r_{c'}(x)) \right\rangle_{\{x\}} \quad (17)$$

In the case of a single channel, the scalar product between a pair of separated signal component vectors will be non-zero only if these vectors are associated with the same channel. In this case, the scalar product between a one-dimensional separated signal component vector a one-dimensional data vector is computed only with the corresponding channel vector also.

Figure 8:
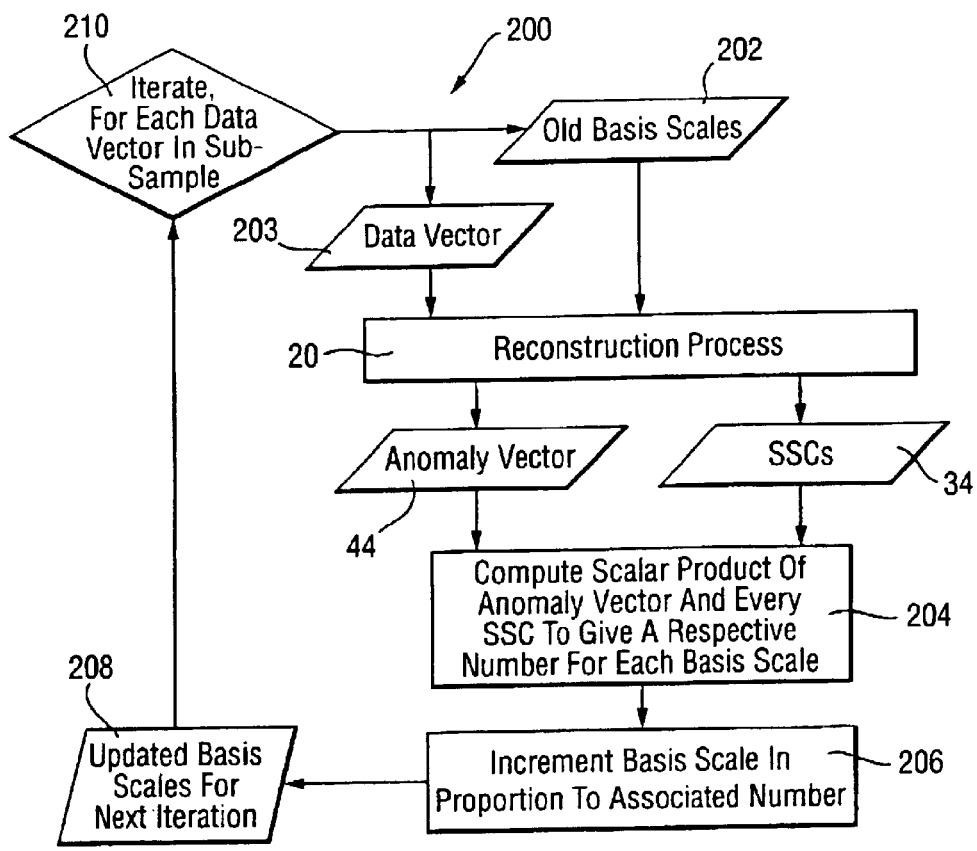
FIG. 8 is a flow diagram of a gradient descent procedure for computing basis scales for use in the reconstruction procedure of the invention shown in FIG. 1.

Referring now to FIG. 8, a block diagram is shown of a procedure indicated generally by 200 for calculating basis scales by the gradient descent method. Elements described earlier are like referenced. This is a preferred approach for implementations of the invention using an optical computer. It is a continuous adaptation training cycle analogous to the process 100 for basis vectors; an equivalent of the batch mode process 70 is also possible but will not be described because it can be inferred straightforwardly by adapting the principles of procedures 70 and 200. In the procedure 200, a sample of the training data vector set is selected as in earlier procedures, and initial values of the basis scales are chosen to become the first "old basis scales" at 202 for use with a first data vector at 203. The old basis scales 202 and first data vector 203 are input to the reconstruction process 20 to yield SSCs 34 and an anomaly vector 44; a respective scalar product is computed at 204 between each SSC 34 and the anomaly vector 44, and this provides a respective scalar product associated with each basis scale: that scalar product is multiplied by the learning rate parameter referred to above to provide a result which is used at 206 to increment the corresponding basis scale. Each data vector therefore provides a set of SSC-anomaly vector scalar products associated with respective basis scales and enabling all the latter to be incremented to generate updated basis scales 208 for use in the next iteration.

The process is then sub-iterated at 210 for the next training data vector 203, the updated basis scales 208 becoming the "old" basis scales at 202. The basis scales approach their optimum configuration of values as a result of iteration. The gradient descent procedure 200 may optionally be run concurrently with the procedure 100 by which the basis vectors are adapted. This procedure 200 for optimising the basis scales may also be made part of the related basis vector equivalent 100: the flow charts for these two processes are similar and both the basis scales and the basis vectors can be updated within the same loop using the same sample of training vectors. The process 200 may be made part of the batch-mode basis vector training process 70.

The matrix inversion process for optimising the basis scales is quite different from the gradient descent processes for optimising the basis vectors and basis scales: it is not an iterative process, because optimal values are directly calculated after a single pass through a sample of training vectors. Optimisation of the basis scales is not independent of optimisation of basis vectors, and so optimal basis scale values must be re-calculated every so often, as basis vectors change.

There are various options for the relative order of the basis scale optimisation and batch-mode training of the basis vectors. Basis scale values may for example be computed once, before undertaking several iterations of the basis vector update process. This option assumes that the effect of slow change in the basis vectors can be ignored for several iterations of their training cycle, after which basis scales are recalculated for the next few iterations.

For batch-mode basis vector training, basis scale values may alternatively be computed before each iteration of the training cycle on the basis of optimisation carried out during the previous iteration. At the end of each iteration, basis scale values may be computed for use in the next iteration, provided that the basis vectors change sufficiently slowly for recalculation of basis scales to be ignored until after several training cycle iterations. This option is perhaps the best compromise for speed, simplicity, and flexibility of implementation on serial, parallel and optical computers.

In a further aspect, the invention provides an alternative to training by batch-mode and continuous adaptation approaches to produce basis vectors, and this alternative is called single-pass training. In this embodiment, at each iteration both the optimal basis scales and the batch-mode updates to the basis vectors are derived for, and using, the same sample of training data vectors in each case.

Referring now to FIG. 9, in which elements previously described are like-referenced, the alternative embodiment referred to above is indicated by 220 in flow diagram form. In this drawing it is assumed that a randomly chosen sample of data vectors has been selected at 222 from an available set of training data vectors, and that this same sample is also used in the matrix inversion procedure 160 to determine optimal values of basis scales which are also inputs as will be described later, but the former is not shown in the drawing to reduce illustrational complexity.

At 224 and 226, a set of $N_{basis}$ vectors and a set of $N_{basis}^2$ vectors are defined as being contents of respective sets of addresses in computer memory referred to as update registers (distinct from the basis vector update registers). Every vector in both sets is $N_{sensors}$-dimensional. Each update register has the capacity to store a respective $N_{sensors}$-dimensional vector with $N_{sensors}N_{samples}$ elements, and each of these elements is given an initial stored value of zero. The two sets of update registers 224 and 226 are respectively designated $q_c$ registers and $Q_{cc'}$ registers, and they appear as signals at 228 and 230 respectively: here the subscript indices c and cc' respectively indicate association with a $c^{th}$ basis vector and with a pair of basis vectors with respective indices c and c'; each of these indices can take values from 1 to the total number of basis vectors $N_{basis}$, so the index c uniquely identifies each of the $q_c$ registers and the indices cc' uniquely identify each of the $Q_{cc'}$ registers (the matrix $Q_{cc'}$ is symmetric so the vector $Q_{cc'}$ has identical elements to the vector $Q_{c'c}$). The $q_c$ registers 228 and the $Q_{cc'}$ registers 230 are incremented during an accumulation cycle at 232, to be described below, which is undergone for each data vector from the training sample; this accumulation cycle uses the same sample of training patterns as does the accumulation cycle iterated at 172 in the matrix inversion procedure 160 for determining the basis scales, with which it is designed to run concurrently.

A current data vector is input at 234 to steps 22 to 32 of the reconstruction process 20 to generate $N_{basis}$ of each of the output vectors 26, non-linearised output vectors 30 and separated signal components (SSCs) 34 as described earlier: these appear at 236 and provide input to a correlation vector derivation stage 238. This latest stage derives, for the current data vector, $N_{basis}$ quantities referred to as data vector's q-correlation vectors, denoted $dvqcv_c$, and $N_{basis}^2$ quantities referred to as data vector's Q-correlation vectors, denoted $dvQcv_{c,c'}$. Both these types of correlation vector are one-dimensional, and they do not depend on the basis scales $a_c$. There is a q-correlation vector for each of the $N_{basis}$ basis vectors, and a Q-correlation vector for each pair-wise combination of the $N_{basis}$ basis vectors i.e. $N_{basis}^2$ Q-correlation vectors in total.

To derive a data vector's q-correlation vector $dvqcv_c$ in the derivation stage 238, each element of each output vector is inserted as the argument in the gradient of the non-linearity function used in the reconstruction process 20 as in Equation (14): for each output vector this provides a respective resulting vector by which the output vector is then multiplied component-wise as defined earlier, which in turn provides a vector of products to be added to the corresponding non-linearised output vector obtained at stage 20. The resulting sum is the current data vector's q-correlation vector $dvqcv_c$ at 240 given by:

$$dvqcv_c \equiv r_c(x) + \left[ r'_c(x) \times \sum_{j_{sensor}=1}^{N_{sensors}} cor(x_{j_{sensor}}, w_{c,j_{sensor}}) \right] \quad (18)$$

where $r_c(x)$ and $r'_c(x)$ are respectively the $c^{th}$ non-linearised output vector 30 (see Equation (11)) and the vector of gradients equivalent for the current input vector x given by Equations (4) and (14) respectively, × indicates component-wise multiplication as before, and the summation is over the $N_{sensors}$ correlations (cor) between data vectors' channel vectors $x_{j_{sensor}}$ and basis vectors' channel vectors (such as the $j^{th}$ channel $w_{c,j_{sensor}}$ of the $c^{th}$ basis vector), this summation producing the $c^{th}$ output vector as has been described.

To derive a data vector's Q-correlation vector $dvQcv_{c,c'}$ in the derivation stage 238, each of the $N_{basis}$ SSCs $cnv(w_{c',j_{sensor}}, r_{c'}(x))$ derived at 20 is correlated with each of the $N_{basis}$ basis vectors in turn to yield a respective correlation function vector for each of the $N_{basis}^2$ pair-wise SSC/basis vector combinations; the SSCs, basis vectors and correlation function vectors all have dimensionality equal to the number of sensors, i.e. they are $N_{sensors}$-dimensional. Denoting the two indices of a correlation function vector as t and i where t indicates time-sample and i indicates sensor/channel, elements of like values of t are summed over all values of i to yield a respective one-dimensional sum vector for each of the $N_{basis}^2$ pair-wise combinations (identified by the pair of indices c and c') of separated signal component (identified by the index c') with basis vector (identified by the index c). The $c^{th}$ basis vector is associated with the same output vector (the $c^{th}$) whose elements are inserted as arguments a of the gradient $r'_c(a)$ of the non-linearity function used at reconstruction 20, and this yields $N_{basis}$ gradient vectors which are used to multiply appropriate sum vectors (i.e. the set of sum vectors indexed by cc' where c' can run from 1 to $N_{basis}$) component-wise to produce the current data vector's $N_{basis}^2$ Q-correlation vectors $dvQcv_{c,c'}$ at 242 given by:

$$dvQcv_{c,c'} \equiv r'_c(x) \times \quad (19)$$

$$\sum_{j_{sensors}=1}^{N_{sensors}} cor(cnv(w_{c',j_{sensor}}, r_{c'}(x)), w_{c,j_{sensor}})$$

where terms are as previously defined.

For each of the $N_{basis}$ data vector's q-correlation vectors and the $N_{basis}^2$ data vector's Q-correlation vectors, a correlation function with the current data vector is computed at 244 and 246 respectively and the result is added to the corresponding $q_c$ or $Q_{cc'}$ register 224 or 226 as appropriate (connections not shown). A correlation function is then computed at 248 between each SSC and each output vector in every one of the $N_{basis}^2$ pair-wise combinations, and each such result is added to the associated $Q_{cc'}$ register 226. This provides inter alia for each element of the matrix of coefficients $Q_{cc'}$ to be updated with a respective contribution from the sample average of the sum of two correlation functions, i.e. firstly that between SSCs $cnv(w_{c',j_{sensor}}, r_{c'}(x))$ and output vectors $r_c(x)$, and secondly that between the current data vector and its Q-correlation vector $dvQcv_{c,c'}$.

At 250, accumulation proceeds by repeating the procedure of steps 242 to 248 for successive data vectors until all such in the selected sample have been processed and their contributions to $q_c$ and $Q_{cc'}$ accumulated in registers 224 and 226 to provide signals 252.

In summary, the final accumulated values equations for the coefficient vector $q_c$ and the matrix of coefficients $Q_{cc'}$ will be given by the following (where dividing by the size of the training sample to obtain true averages from accumulated sums is not necessary because such division is irrelevant to the values of the basis vectors ultimately derived using these quantities):

$$(q_c)_{i_{sensor}} \equiv \quad (20)$$

$$\left\langle cor\left( x_{i_{sensor}}, r_c(x) + \left[ r'_c(x) \times \sum_{j_{sensor}=1}^{N_{sensors}} cor(x_{j_{sensor}}, w_{c,j_{sensor}}) \right] \right) \right\rangle_{\{x\}}$$

-continued $$(Q_{c,c'})_{i_{sensor}} \equiv \langle cor(cnv(w_{c',j_{sensor}}, r'_{c'}(x)), r_c(x)) \rangle_{\{x\}} + \quad (21)$$

$$\left\langle cor\left(x_{i_{sensor}}, r'_c(x) \times \sum_{j_{sensor}=1}^{N_{sensors}} cor(cnv(w_{c',j_{sensor}}, r'_{c'}(x)), w_{c,j_{sensor}})\right)\right\rangle_{\{x\}}$$

By rearranging Equations (6), (11), (12), (13) and (15) it can be shown that the basis vector update register contents 60 (see FIGS. 3 and 4), i.e. $bvur_{c,i_{sensor}}$ for the $c^{th}$ basis vector's channel vector associated with the $i^{th}$ sensor $i_{sensor}$, is given by:

$$bvur_{c,i_{sensor}} = a_c(q_c)_{i_{sensor}} - a_c \sum_{c'}^{N_{basis}} a_{c'}(Q_{c,c'})_{i_{sensor}} \quad (22)$$

where $a_c$ is the $c^{th}$ basis scale. Both $q_c$ and $Q_{cc'}$ are independent of the basis scales, so the basis vector updates are quadratic functions of the basis scales. After $q_c$ and $Q_{cc'}$ have been accumulated, the optimal basis scales 254 are computed by the matrix inversion procedure 160 (see FIG. 7) using the same sample of training data, and Equation (22) is then evaluated at 256 to determine basis vector updates 258 for each basis vector as follows. Basis vector updates are accumulated in registers (not shown) each of which is set to a first value which is the first term on the right hand side of Equation (22), i.e. for the $c^{th}$ basis vector a vector $q_c$ weighted by a respective basis scale $a_c$. Each basis vector update register is then decremented by subtraction of the second term on the right hand side of Equation (22), i.e. for the $c^{th}$ basis vector a product of a respective basis scale $a_c$ with a sum over values of c' of vectors $Q_{cc'}$ weighted by respective basis scales $a_{c'}$.

After a first sample has been used to provide a first update or contribution to each basis vector, the procedure 220 is iterated using further samples and the basis vectors are accumulated from successive contributions obtained likewise and are brought closer to convergence at each sample iteration. The values of the basis vectors at each iteration are produced by augmenting those of the previous iteration, so an initial choice is required for the values of the basis vectors before the first iteration. The initial values can be chosen in various ways, i.e. the elements of the basis vectors may be initialised as:

(a) random numbers; or
(b) estimates based on expert prior knowledge of a system being monitored.

The initial elements of the basis vectors should not all be the same value: differences are necessary to provide for the various basis vectors to converge and encode different features of the data. The basis vectors may be normalised at each iteration, e.g. to constant vector length. If so, they should also be normalised in the same way after initialisation, i.e. before the first sample iteration.

The invention was tested using twelve magnetic search coils to monitor the rotation of an electric motor: the coils were distributed in space near the motor. This gave twelve signal channels which were used to find differences between data sets and sensitivity to manually introduced distortion; here a data set is a combination of the outputs of four channels, so twelve channels gave three such sets. It was found that the invention has good capability for detecting changes in a motor's fundamental frequency and harmonics.

Distortion sensitivity was checked by introducing a small simulated distortion into one peak of each sensor signal. Such a distortion would correspond to a fault occurring once every motor shaft revolution, a rotor pole piece overheating for example, or demagnetisation of one of the motor's magnets. The distortion was simulated by a reduction in waveform amplitude: three degrees of distortion were used, i.e. 5%, 10% and 15% reductions in amplitude. Such effects are difficult to detect by conventional spectrum analysis, but the invention was found to detect them successfully and even to discriminate between them.

Data were also collected from a conventional induction motor, from which an acoustic signal and a vibration signal were obtained. Data sets corresponding to three motor conditions were produced, normal operation and both 20% and 40% imbalances of the motor's power supply. The invention gave good results in fault detection, discrimination and localisation.

The invention was used to investigate mechanical faults in gearboxes. These faults often originate as small scale damage in one or more gear teeth, which in turn causes meshing impacts giving rise to vibrations in the form of short duration transients. In the prior art it is not possible to detect tooth damage extending less than 30% of tooth width—the invention proved to be capable of detecting small faults corresponding to tooth damage of lesser extent than this. Detection of small faults in important to give early warning of potential problems for rectification before they become severe.

A two stage helical gearbox was also investigated: four channels of vibration data were obtained. The invention was used to analyse the data and was found to be capable of detecting and discriminating small faults in a way that cannot be achieved by conventional state of the art techniques such as spectrum and time-frequency analysis.

The procedures previously described for deriving correlation and convolution functions between vectors are most appropriate for those having periodic boundary conditions. A correlation function between two one-dimensional vectors each with T time-samples is equivalent to a set of T scalar products. In this set, the $(t+1)^{th}$ scalar product would be the same as the $t^{th}$ if all the elements of one of the vectors were shifted by one time-sample, moving the last time-sample of that vector from the end to the beginning. If the last time-sample of a vector is effectively adjacent to the first time-sample in this way, i.e. if the vector represents a circle of time-samples rather than a line with beginning and end, it is said to have a periodic or circular boundary condition.

It follows that the embodiment of the invention described above is best suited to data vectors that have periodic boundary conditions, e.g. data with a periodic waveform, for which the end repeats the beginning at least approximately. For such vectors, beginning and end are arbitrarily chosen and have no effect on the nature of the waveform. In other words, data vectors have a time co-ordinate with an arbitrary zero having no significance as regards the invention's effectiveness. An example of this kind of data is that obtained from a rotary machine, in which each data vector spans a whole number of revolutions. The embodiment of the invention described herein does not require data to be synchronised with a temporal reference point.

The foregoing embodiment may be less effective for non-periodic sensor data, because a discontinuity between its end and beginning will be treated like any other waveform region; this might lead to spurious artefacts. This potential problem may be overcome by embedding the data in a significantly longer, zero-padded, data vector, or setting some elements of the correlation/convolution functions to zero to exclude scalar products corresponding to wrapped-around vectors spanning a beginning-end transition.

The choice of non-linear function for the reconstruction procedure 20 is not particularly critical, but some are better than others. Non-linear functions characterised by thresholds are useful because trained basis vectors produced using them are found to correspond to interesting features that arise often in training data: e.g. correlated combinations of a few harmonic frequencies, or transients or other features localised in time. It is an empirical observation that the invention then behaves like a new method for independent component analysis (ICA) which is similar to blind signal separation except that in the present invention components (basis vectors) are not derived from any statistical independence principle.

Threshold functions are typically fairly small (close to zero) for small values of their input argument, and begin to grow quickly for input values around their characteristic threshold value. It is useful if they are not sharp but relatively smooth and continuous, like the sigmoid function previously described, because if so training converges smoothly. It is also useful if the function does not become exactly zero when its input argument is less than the threshold value, because training may not converge at all if the function is exactly zero for all data vectors in the training set. A preferred threshold function asymptotes exponentially towards zero in its sub-threshold region.

As in the sigmoid function, a threshold function may level out for large values of its input. Alternatively it may carry on growing for large values of its input argument, like the function:

$$r(a) \propto s \log\left[1 + \exp\left(\frac{a-\theta}{s}\right)\right] \quad (23)$$

whose derivative is the sigmoid: parameters are as defined for Equation (2); this function becomes approximately linear far above threshold and asymptotes exponentially towards zero in its sub-threshold region.

Training may converge much less slowly if the graph of the threshold function grows even faster than this, like the square of the Equation (3) function, i.e.:

$$r(a) \propto \left(s \log\left[1 + \exp\left(\frac{a-\theta}{s}\right)\right]\right)^2 \quad (24)$$

This function asymptotes exponentially towards zero in its sub-threshold region, but becomes approximately quadratic far above threshold.

Other non-linear functions arising from natural physical properties of optical components may be more suitable for optical implementations of the invention.

Training would converge in the smoothest possible fashion if the entire training set were used in each iteration of the batch-mode training cycle, eliminating statistical fluctuations from one iteration to the next. However, it requires proportionally more computer time to train with a proportionally larger number of input vectors, so in practice there is likely to be some subjectively optimal number of training vectors presented per iteration, which represents a compromise between training time and magnitude of statistical fluctuations. These fluctuations must not be so large that training never converges.

A rule of thumb is available to indicate the minimum number of training vectors per iteration. Using gradient descent, the invention minimises an objective function which is the mean squared length of the anomaly vector. It is well known that gradient descent cannot increase the value of its objective function with time (ignoring statistical fluctuations), but can only reduce it monotonically until it converges to a minimum value. Consequently, the test of whether the sample or subset of training patterns presented per iteration is large enough is that the objective function should decrease monotonically from one iteration to the next, and should not jump about as would be the case if statistical fluctuations were too dominant. Only when the optimisation has converged near the minimum value of the objective function should the fluctuations cause an occasional small increase from one iteration to the next.

The number of training vectors sampled per iteration should be much greater than—ideally at least ten times—the number of basis vectors. If statistical fluctuations are to be uncorrelated from one iteration to the next, the selection of input vectors chosen at each iteration should be a completely random subset of the whole training set: training should not use the same small subset, or highly correlated subsets, repeatedly. This is a well-known property of all neural network training processes and will not be described.

The value of the learning rate parameter has no effect on the nature of the trained model provided it is small enough. Rather like the number of training vectors per iteration, the learning rate determines the size of statistical fluctuations from one iteration to the next. Therefore, a test of whether the learning rate is small enough is that the mean squared length of the anomaly vector should decrease monotonically from one iteration to the next. The learning rate should not be set so small that learning takes an impractical length of time to converge, however. In the case when batch-mode training is employed and when both the basis vector update registers and the basis vectors themselves have been normalised to unit length, it can be shown analytically that smooth convergence requires the learning rate parameter to be significantly less than 1 (provided that the basis vector update registers have been normalised to unit length). A value of 0.1 is a safe estimate to start a trial-and-error process: this value may be progressively reduced until statistical fluctuations are no longer dominant.

In the embodiment of the invention described above, some process steps are stated to be duplicated 'for each basis vector'. These duplications are not however represented explicitly in the drawings as iterative loops, because in optical or parallel computer implementations of the invention, an operation can be applied for all basis vectors in parallel: iterative loops are implied only for serial computer implementations of the invention.

The reconstruction process 20 is an important feature of the invention. The invention may be used in two distinct modes: the monitoring mode and the training mode. It may be used in the monitoring mode only, if a pre-trained configuration of basis vector and scale parameters is available.

The procedure of the invention is what is referred to as an "unsupervised" procedure, in that it does not require prior knowledge of the characteristics of the system to be monitored. It adapts to unlabelled, unclassified and previously unseen training data, i.e. training is "unsupervised". The procedure generates its own model of characteristic features of training data. Laborious manual labelling of the data is unnecessary.

The invention may therefore be used to monitor novel environments and designs. The well-known linear technique of Principal Component Analysis (PCA) is used for some similar applications and also has this advantage; however, because the invention uses a non-linear approach, it can model much more subtle, important and useful features of training data than PCA.

In use of the invention for detecting machine faults, the variation in the signals from a healthy machine, e.g. due to changing engine load, will typically be greater than the variation that results when a fault develops and impairs machine performance. It is therefore advisable to train different models using data vectors obtained under different, known operating conditions, and subsequently to compare data vectors with models trained under like operating conditions. It is also possible to run the training and monitoring phases concurrently and continuously, to detect departures from the continuously updating model that might arise over relatively short timescales.

The invention compares input signal vectors and basis vectors using correlation and convolution functions. This is in contradistinction to radial measure used in radial basis function methods, see e.g. U.S. Pat. Nos. 5,377,306 and 5,453,940, and to simple scalar-product measure used in projection pursuit and perceptron or neural network methods. Although a convolution is mathematically equivalent to computing a particular set of scalar-products that are constrained in a special way, the computational process of convolution is totally different from computing the equivalent set of scalar-products. Even when implemented on a conventional serial computer, using Fourier transforms in particular it has the dual advantages of being a much faster computational process and requiring a far smaller amount of computer memory compared to other approaches.

Prior-art neural network approaches that compute radial distances or scalar products are sensitive to the degree of time synchronisation of input signals. The present invention uses a time-dimension correlation/convolution approach which is time invariant: in consequence it can be trained and perform reconstruction and anomaly enhancement functions irrespective of whether or not input signals are translated or offset in time. It is therefore unnecessary for input signals to be synchronised with respect to any absolute reference point in time. This will be an important characteristic for many applications.

The procedure of the invention has properties which are particularly well suited to parallel hardware implementations, for example a multi-processing parallel computer, an array of digital signal processing integrated circuits, or an optical or holographic computing device. Of these the last mentioned might for example be based adaptive photorefractive volume-holographic crystals, whose adaptive physical properties could in principle be exploited to implement adaptive training algorithms very efficiently. Such parallel hardware could in principle implement this invention much faster than a conventional serial computer could implement prior art techniques.

The equations given in the foregoing description for calculating the quantities and results generated in the procedures 20, 50, 70, 100, 120, 160, 200 and 220 can clearly be evaluated by an appropriate computer program recorded on a carrier medium and running on a conventional computer system. Such a program is straightforward for a skilled programmer to implement without requiring invention, because correlation, convolution, Fourier transforms, summation, multiplication, squaring, square roots, averaging etc are well known computational procedures. Such a program and system will therefore not be described further.

What is claimed is:

1. A signal processing technique for generating separated signal components incorporating the steps of:
   correlating basis vectors with input data vectors to produce output vectors,
   applying to the output vectors a non-linear function having a gradient to produce non-linearised output vectors, and
   convolving the non-linearised output vectors with the basis vectors to produce separated signal components.

2. A signal processing technique according to claim 1 wherein data vectors and basis vectors are multi-dimensional and multi-dimensional convolution and correlation operations are implemented by:
   a) arranging both data vectors and basis vectors as pluralities of one-dimensional signals referred to as channel vectors,
   b) correlating or convolving each data vector channel vector with a corresponding basis vector channel vector to yield a plurality of one-dimensional correlation or convolution functions, and
   c) vectorially adding the plurality of correlation or convolution functions to produce a sum vector providing a convolution or correlation result.

3. A signal processing technique according to claim 1 wherein convolution and correlation operations between pairs of one-dimensional signals are implemented by fast Fourier transformation of both signals to the frequency domain, taking the complex conjugate of one of the two Fourier transforms in the case of correlation, multiplying together corresponding frequency components of both Fourier transforms after conjugation of one if implemented, and then implementing an inverse fast Fourier transformation back to the original domain.

4. A signal processing technique according to claim 1 including the step of combining the separated signal components to form at least one result vector comprising at least one of a reconstruction of an input data vector and an anomaly vector indicating the reconstruction's deviation from the associated input data vector.

5. A signal processing technique according to claim 4 wherein combining the separated signal components to form at least one result vector comprises multiplying separated signal components by respective basis scales and adding resulting products by vector addition.

6. A signal processing technique according to claim 1 wherein basis vectors are determined by a training process including:
   a) arranging non-identical initial current values for basis vectors,
   b) operating the signal processing technique using the current values of the basis vectors,
   c) deriving for each basis vector at least one respective correland vector for correlation with an associated vector selected from input data and at least one result vector comprising at least one of a reconstruction of an input signal and an anomaly signal indicating the reconstruction's deviation from its associated input signal,
   d) for each basis vector, correlating the at least one respectye correland vector with the associated vector to produce at least one respective correlation function,
   e) modifying each basis vector to form a respective new current value incorporating a contribution in accordance with the at least one correlation function associated with the respective correland vector,
   f) iterating steps (b) to (e) until the current values converge.

7. A signal processing technique according to claim 6 wherein the said contribution is proportional to the at least one correlation function, the constant of proportionality in this connection being referred to as the learning rate parameter.

8. A signal processing technique according to claim 6 wherein the at least one correland vector is at least one of:

a) an input data vector's correlation vector derived by applying the non-linear function gradient to each element of an output vector to derive a gradient output vector and multiplying the gradient output vector by an associated correlation vector obtained from a correlation of basis and anomaly vectors, and b) an anomaly vector's correlation vector derived from a non-linearised output vector.

9. A signal processing technique according to claim 8 wherein the at least one correland vector is or includes a data vector's correlation vector corresponding to a basis vector which is multi-dimensional, associated with a plurality of channels and gives rise to a plurality of correlation functions when correlated with the anomaly vector, and prior to multiplication by the gradient output vector the correlation functions are reduced to a correlation vector in one dimension by combining contributions of like time index from different channels.

10. A signal processing technique according to claim 8 wherein the at least one correland vector is or includes an input data vector's correlation vector, and prior to multiplication by the said correlation function, the gradient output vector is multiplied by a respective weighting factor selected from quantities collectively referred to as basis scales and which when applied to respective input data vector reconstructions have the effect of reducing mean squared errors between such reconstructions and associated input data vectors used to derive them.

11. A signal processing technique according to claim 10 wherein the basis scales are computed by:
    a) arranging non-identical initial current values for basis scales,
    b) calculating a respective scalar product of an anomaly vector with each separated signal component associated with a like input data item,
    c) modifying each basis scale to form a respective new current value incorporating a contribution in accordance with the scalar product associated therewith, and
    d) iterating steps (b) and (c) for successive data items.

12. A signal processing technique according to claim 10 wherein the basis scales are computed by calculating:
    a) over an input data set, a mean value of a vector of scalar products of input data items and associated separated signal components (SSCs),
    b) over an input data set, a mean value of a matrix of scalar products of pairs of separated signal components associated with individual input data items,
    c) an inverse of the mean scalar product matrix, and
    d) a product of the inverse matrix and the mean vector of data-SSC scalar products, the product being a vector having elements which are basis scales.

13. A signal processing technique according to claim 8 wherein the at least one correland vector is or includes an anomaly vector's correlation vector derived by multiplying elements of a non-linearised output vector by its respective basis scale.

14. A signal processing technique according to claim 13 wherein the at least one correland vector is a plurality of correland vectors, the technique including the step of computing correlation functions with such vectors, and the step of combining the resulting plurality of correlation functions, prior to modifying each basis vector to form a respective new current value.

15. A signal processing technique according to claim 13 wherein basis vectors are determined by a batch-mode iterative procedure involving a training set of input data for use in input data reconstruction, and wherein in each iteration of the procedure a respective sub-set of the training set undergoes reconstruction, and successive basis vectors are modified to form respective new current values incorporating multiple contributions derived from input data in the sub-set, each contribution being in accordance with the associated at least one correlation function associated with the respective correland vector.

16. A signal processing technique according to claim 15 wherein the number of input data items in each sub-set is at least as great as the number of basis vectors and each sub-set is selected randomly from the training set avoiding re-use of a small sub-set or of highly correlated sub-sets.

17. A signal processing technique according to claim 1 wherein the non-linear function is a threshold function which has at least one of the following properties:
    a) being small for small argument values and begins to grow quickly for near threshold argument values,
    b) not being sharp but relatively smooth and continuous,
    c) not becoming exactly zero for argument values less than the threshold value,
    d) asymptoting exponentially towards zero for argument values less than the threshold value, and
    e) being a sigmoid function.

18. A signal processing technique according to claim 1 wherein the basis vectors are obtained by:
    a) providing initial value of current basis vectors,
    b) deriving data vector's q-correlation and Q-correlation vectors from current basis vectors and non-linearised output vectors,
    c) correlating the data vector's q-correlation vector with its associated data vector,
    d) correlating the data vector's Q-correlation vector with its associated data vector,
    e) correlating output vectors with separated signal components, such vectors and components having been derived from the associated data vector,
    f) summing those correlations which involve data vector's q-correlation vectors,
    g) summing those correlations which involve data vector's Q-correlation vectors and output vectors.
    h) repeating steps (b) to (g) for successive data vectors, and
    i) deriving contributions to basis vectors from a quadratic function of basis scales including a linear term involving added correlations associated with data vector's q-correlation vectors and subtracted therefrom a quadratic term involving other added correlations.

19. A computer program for controlling operation of a computer system and providing for generation of separated signal components, wherein the program is arranged to implement a procedure incorporating the steps of:
    a) correlating basis vectors with input data to produce output vectors,
    b) applying to the output vectors a non-linear function having a gradient to produce non-linearised output vectors, and
    c) convolving the non-linearised vectors with the basis vectors to produce separated signal components.

20. A computer program according to claim 19 wherein data and basis vectors are multi-dimensional and the procedure implements convolution and correlation operations by:
    a) arranging both data vectors and basis vectors as pluralities of one-dimensional signals referred to as channel vectors, b) correlating or convolving each data vector channel vector with a corresponding basis vector channel vector to yield a plurality of one-dimensional correlation or convolution functions, and c) vectorially adding the plurality of correlation or convolution functions to produce a sum vector providing a convolution or correlation result.

21. A computer program according to claim 20 wherein the procedure includes the step of combining the separated signal components to form at least one result vector comprising at least one of a reconstruction of an input data vector and an anomaly vector indicating the reconstruction's deviation from the associated input data vector.

22. A computer program according to claim 21 wherein the step of combining the separated signal components to form at least one result vector comprises multiplying separated signal components by respective basis scales and adding resulting products by vector addition.

23. A computer program according to claim 21 wherein the procedure determines basis vectors by a training process including:

a) arranging non-identical initial current values for basis vectors, b) operating the signal processing technique using the current values, c) deriving for each basis vector at least one respective correland vector for correlation with an associated vector selected from input data and at least one result vector comprising at least one of a reconstruction of an input signal and an anomaly signal indicating the reconstruction's deviation from the input signal, d) for each basis vector, correlating the at least one respective correland vector with the associated vector to produce at least one respective correlation function, e) modifying each basis vector to form a respective new current value incorporating a contribution in accordance with the at least one correlation function associated with the respective correland vector, f) iterating steps (b) to (e) until the current values converge.

24. A computer program according to claim 23 wherein the said contribution is proportional to the at least one correlation function, the constant of proportionality in this connection being referred to as the learning rate parameter.

25. A computer program according to claim 23 wherein the at least one correlated signal is at least one of:

a) an input data vector's correlation vector derived by applying the non-linear function gradient to each element of an output vector to derive a gradient output vector and multiplying the gradient output vector by an associated correlation vector obtained from a correlation of basis and anomaly vectors, and b) an anomaly vector's correlation vector derived from a non-linearised output vector.

26. A computer program according to claim 25 wherein the at the at least one correland vector is or includes a data vector's correlation vector corresponding to a basis vector which is multi-dimensional, associated with a plurality of channels and gives rise to a plurality of correlation functions when correlated with the anomaly vector, and prior to multiplication by the gradient output vector the correlation functions are reduced to a correlation vector in one dimension by combining contributions of like time index from different channels.

27. A computer program according to claim 25 characterised in that wherein the at least one correland vector is or includes an input data vector's correlation vector, and prior to multiplication by the said correlation function, the gradient output vector is multiplied by a respective weighting factor selected from quantities collectively referred to as basis scales and which when applied to respective input data vector reconstructions have the effect of reducing mean squared errors between such reconstructions and associated input data vectors used to derive them.

28. A computer program according to claim 27 wherein the at least one correland vector is or includes an anomaly vector's correlation vector derived by multiplying elements of a non-linearised output vector by its respective basis scale.

29. A computer program according to claim 28 wherein the at least one correland vector is a plurality of correlation vectors, and the procedure includes the step of computing correlation functions with such vectors the step of combining the resulting plurality of correlation functions, prior to modifying each basis vector to form a respective new current value.

30. A computer program according to claim 28 wherein basis vectors are determined by a batch-mode iterative procedure involving a training set of input data for use in input data reconstruction, and wherein in each iteration of the procedure a respective sub-set of the training set undergoes reconstruction, and successive basis vectors are modified to form respective new current values incorporating multiple contributions derived from input data in the sub-set, each contribution being in accordance with the associated at least one correlation function associated with the respective correland vector.

31. A computer program according to claim 30 wherein the number of input data items in each sub-set is at least as great as the number of basis vectors and the procedure provides for each sub-set to be selected randomly from the training set avoiding re-use of a small sub-set or of highly correlated sub-sets.

32. A computer program according to claim 27 wherein the procedure provides for the basis scales to be computed by calculating;

a) over an input data set, a mean value of a vector of scalar products of input data items and associated separated signal components (SSCs), b) over an input data set, a mean value of a matrix of scalar products of pairs of separated signal components associated with individual input data items, c) an inverse of the mean scalar product matrix, and d) a product of the inverse matrix and the mean vector of data-SSC scalar products, the product being a vector having elements which are basis scales.

33. A computer program according to claim 27 wherein the procedure provides for the basis scales to be computed by:

a) arranging non-identical initial current values for basis scales, b) calculating a respective scalar product of an anomaly vector with each separated signal component associated with a like input data item, c) modifying each basis scale to form a respective new current value incorporating a contribution in accordance with the scalar product associated therewith, and d) iterating steps (b) and (c) for successive data items.

34. A computer program according to claim 19 wherein the procedure implements convolution and correlation operations between pairs of vectors by fast Fourier transformation of both vectors to the frequency domain, taking a complex conjugate of one of the two Fourier transforms in the case of correlation only, multiplying together corresponding frequency components of both Fourier transforms after conjugation if implemented, and then implementing an inverse fast Fourier transformation back to the time domain.

35. A computer program according to claim 19 wherein the non-linear function is a threshold function which has at least one of the following properties:
   a) being small for small argument values and begins to grow quickly for near threshold argument values,
   b) not being sharp but relatively smooth and continuous,
   c) not becoming exactly zero for argument values less than the threshold value,
   d) asymptoting exponentially towards zero for argument values less than the threshold value, and
   e) being a sigmoid function.

36. A computer program according to claim 19 wherein the procedure provides for the basis vectors to be obtained by:
   a) providing initial values of current basis vectors,
   b) denying data vector's q-correlation and Q-correlation vectors from current basis vectors and non-linearised output vectors,
   c) correlating the data vector's q-correlation vector with its associated data vector,
   d) correlating the data vector's Q-correlation vector with the associated data vector,
   e) correlating output vectors with separated signal components, such vectors and components having been derived from the associated data vector,
   f) summing those correlations which involve data vector's q-correlation vector,
   g) summing those correlations which involve data vector's Q-correlation vectors and output vectors
   h) repeating steps (b) to (g) for successive data vectors, and
   i) deriving contributions to basis vectors from a quadratic function of basis scales including a linear term involving added correlations associated with data vector's q-correlation vectors and subtracted therefrom a quadratic term involving other added correlations.

37. A computer system programmed with a program in accordance with claim 19.

38. A computer system programmed to execute a processing technique to generate separated signal components, wherein the technique incorporates the steps of:
   a) correlating basis vectors with input data to produce output vectors,
   b) applying to the output vectors a non-linear function having a gradient to produce non-linearised vectors, and
   c) convolving the non-linearised vectors with the basis vectors to produce separated signal components.

39. A computer system according to claim 38 wherein data and basis vectors are multi-dimensional and the convolution and correlation operations are implemented by:
   a) arranging both data vectors and basis vectors as pluralities of one-dimensional signals referred to as channel vectors,
   b) correlating or convolving each data vector channel vector with a basis vector channel vector to yield a plurality of one-dimensional correlation or convolution functions, and
   c) vectorially adding the plurality of correlation or convolution functions to produce a sum vector providing convolution or correlation result.

40. A computer system according to claim 39 wherein the technique which it is programmed to execute includes combining the separated signal components to form at least one result vector comprising at least one of a reconstruction of an input data vector and an anomaly vector indicating the reconstruction's deviation from the associated input data vector.

41. A computer system according to claim 40 wherein the technique with which the system is programmed provides for combining the separated signal components to form at least one result vector by multiplying separated signal components by respective basis scales and adding resulting products by vector addition.

42. A computer system according to claim 40 wherein the technique determines basis vectors by a training process including:
   a) arranging non-identical initial current values for basis vectors,
   b) operating the signal processing technique using the current values,
   c) deriving for each basis vector at least one respective correland vector for correlation with an associated vector selected from input data and said at least one result vector,
   d) for each basis vector, correlating the at least one respective correland vector with the associated vector to produce at least one respective correlation function,
   e) modifying each basis vector to form a respective new current value incorporating a contribution in accordance with the at least one correlation function associated with the respective correland vector,
   f) iterating steps (b) to (e) until the current values converge.

43. A computer system according to claim 42 wherein the at least one correland vector is at least one of:
   a) an input data vector's correlation vector derived by applying the non-linear function gradient to each element of an output vector to derive a gradient output vector and multiplying the gradient output vector by an associated correlation vector obtained from a correlation of basis and anomaly vectors, and
   b) an anomaly vector's correlation vector derived from a non-linearised output vector.

44. A computer system according to claim 43 wherein the at least one correland vector is or includes a data vector's correlation vector corresponding to a basis vector which is multi-dimensional, associated with a plurality of channels and gives rise to a plurality of correlation functions when correlated with the anomaly vector, and prior to multiplication by the gradient output vector the correlation functions are reduced to a correlation vector in one dimension by combining contributions of like time index from different channels.

45. A computer system according to claim 43 wherein the at least one correland vector is or includes an input data vector's correlation vector, and prior to multiplication by the said correlation function, the gradient output vector is multiplied by a respective weighting factor selected from quantities collectively referred to as basis scales and which when applied to respective input data vector reconstructions have the effect of reducing mean squared errors between such reconstructions and associated input data vectors used to derive them.

46. A computer system according to claim 45 wherein the technique provides for the basis scales to be computed by calculating over an input data set:

a) a mean value of a vector of scalar products of input data items and associated separated signal components (SSCs),
b) a mean value of a matrix of scalar products of pairs of separated signal components associated with individual input data items,
c) an inverse of the mean scalar product matrix, and
d) a product of the inverse matrix and the mean vector of data-SSC scalar products, the product being a vector having elements which are basis scales.

47. A computer system according to claim 45 wherein the technique provides for the basis scales to be computed by:
a) arranging non-identical initial current values for basis scales,
b) calculating a respective scalar product of an anomaly vector with each separated signal component associated with a like input data item,
c) modifying each basis scale to form a respective new current value incorporating a contribution in accordance with the scalar product associated therewith, and
d) iterating steps (b) and (c) for successive data items.

48. A computer system according to claim 43 wherein the at least one correland vector is or includes an anomaly vector's correlation vector derived by multiplying elements of a non-linearised output vector by its respective basis scale.

49. A computer system according to claim 48 wherein the at least one correland vector is a plurality of correland vectors, and the technique includes the step of computing correlation functions with such vectors and the step of combining the resulting plurality of correlation functions, prior to modifying each basis vector to form a respective new current value.

50. A computer system according to claim 48 wherein basis vectors are determined by a batch-mode iterative procedure involving a training set of input data for use in input data reconstruction, and wherein in each iteration of the procedure a respective sub-set of the training set undergoes reconstruction, and successive basis vectors are modified to form respective new current values incorporating multiple contributions derived from input data in the sub-set, each contribution being in accordance with the associated at least one correlation function associated with the respective correland vector.

51. A computer system according to claim 38 wherein the technique implements convolution and correlation operations by fast Fourier transformation of both signals to the frequency domain, taking the complex conjugate of one of the two Fourier transforms in the case of correlation only, multiplying together corresponding frequency components of both Fourier transforms after conjugation of one if implemented, and then implementing an inverse fast Fourier transformation back to the original domain.

52. A computer system according to claim 38 wherein the non-linear function is a threshold function which has at least one of the following properties:
a) being small for small argument values and begins to grow quickly for near threshold argument values,
b) not being sharp but relatively smooth and continuous,
c) not becoming exactly zero for argument values less than the threshold value,
d) asymptoting exponentially towards zero for argument values less than the threshold value, and
e) being a sigmoid function.

53. A computer system according to claim 38 wherein the technique with which the system is programmed provides for the basis vectors to be obtained by:
a) providing initial values of current basis vectors,
b) deriving data vector's q-correlation and Q-correlation vectors from current basis vectors and non-linearised output vectors,
c) correlating the data vector's q-correlation vector with its associated data vector,
d) correlating the data vector's Q-correlation vector with the associated data vector,
e) correlating output vectors with separated signal components, such vectors and components having been derived from the associated data vector,
f) summing those correlations which involve data vector's q-correlation vectors,
g) summing those correlations which involve data vector's Q-correlation vectors and output vectors,
h) repeating steps (b) to (g) for successive data vectors, and
i) deriving contributions to basis vectors from a quadratic function of basis scales including a linear term involving added correlations associated with data vector's q-correlation vectors and subtracted therefrom a quadratic term involving other added correlations.

* * * * *